United States Patent
Hasegawa et al.

(10) Patent No.: US 8,892,713 B2
(45) Date of Patent: Nov. 18, 2014

(54) STORAGE SYSTEM AND LICENSE MANAGEMENT METHOD

(71) Applicant: Hitachi, Ltd., Tokyo (JP)

(72) Inventors: Tomohiko Hasegawa, Odawara (JP); Tsutomu Sukigara, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 26 days.

(21) Appl. No.: 13/699,138

(22) PCT Filed: Oct. 31, 2012

(86) PCT No.: PCT/JP2012/006991
§ 371 (c)(1),
(2), (4) Date: Mar. 27, 2013

(87) PCT Pub. No.: WO2014/068618
PCT Pub. Date: May 8, 2014

(65) Prior Publication Data
US 2014/0122677 A1    May 1, 2014

(51) Int. Cl.
*G06F 15/173*    (2006.01)
(52) U.S. Cl.
USPC ............................................ 709/223; 705/59
(58) Field of Classification Search
USPC .......................... 709/223, 226; 705/59; 726/1
See application file for complete search history.

(56) References Cited

U.S. PATENT DOCUMENTS

| 7,831,514 B2 * | 11/2010 | Fujimoto ........................ 705/59 |
| 8,260,893 B1 * | 9/2012 | Bandhole et al. ............. 709/223 |
| 8,302,149 B2 * | 10/2012 | Della-Libera et al. ............ 726/1 |
| 2004/0153416 A1 | 8/2004 | Fujimoto |
| 2005/0289072 A1 * | 12/2005 | Sabharwal ...................... 705/59 |
| 2006/0287961 A1 | 12/2006 | Mori et al. |
| 2007/0078984 A1 * | 4/2007 | Abei ............................. 709/226 |
| 2012/0017042 A1 | 1/2012 | Matsui et al. |
| 2012/0226788 A1 * | 9/2012 | Jackson ........................ 709/223 |

OTHER PUBLICATIONS

PCT International Search Report and Written Opinion on application PCT/JP2012/006991 mailed Jul. 11, 2013; 10 pages.

* cited by examiner

*Primary Examiner* — Dustin Nguyen
(74) *Attorney, Agent, or Firm* — Foley & Lardner LLP

(57) ABSTRACT

Provided is straightforward management of licenses which are assigned to virtual storage spanning a plurality of physical storage. In a storage system 1 which provides virtual storage spanning a plurality of physical storage apparatuses 2 to a host computer 4, the physical storage apparatuses 2 comprise a controller portion 11 which manages storage, and a license management portion (management computer 12) which manages licenses assigned to virtual storage such that the licenses are shared by the plurality of physical storage apparatuses 2 comprising the virtual storage. In the plurality of physical storage apparatuses 2, in which the controller portion 11 and the license management portion in the same physical storage apparatus 2 synchronize and retain first information for managing the storage and second information for managing the licenses, and share the licenses, the respective license management portions retain the second information relating to the licenses with the same content.

13 Claims, 23 Drawing Sheets

FIG. 6

| LICENSE INFORMATION | | | | | | |
|---|---|---|---|---|---|---|
| LICENSE NAME | CREATABLE POOL CAPACITY UPPER LIMIT | CREATED POOL CAPACITY | USABLE PROCESSOR COUNT UPPER LIMIT | USABLE PROCESSOR COUNT | LICENSE EXPIRY DATE | |
| STORAGE VIRTUALIZATION FUNCTION | 100GB | 80GB | 16 | 8 | 2012/07/11 | |
| 111 | 112 | 113 | 114 | 115 | 116 | 110 |

| INTEGRATED POOL MANAGEMENT INFORMATION (INTEGRATED POOL VOLUME) | | |
|---|---|---|
| INTEGRATED POOL VOLUME NUMBER | LOGICAL VOLUME NUMBER | INTEGRATED POOL NUMBER |
| 0111 | 0011 | 001 |
| 0112 | 0012 | 001 |
| 131 | 132 | 133 |

(b)

140

| INTEGRATED POOL MANAGEMENT INFORMATION (INTEGRATED POOL) | |
|---|---|
| INTEGRATED POOL NUMBER | PRODUCT NUMBER OF PHYSICAL STORAGE APPARATUS WITH INTEGRATED POOL OWNER RIGHTS |
| 001 | 1231 |
| 002 | 1241 |
| 141 | 142 |

| RESOURCE MANAGEMENT INFORMATION (VOLUMES) | |
|---|---|
| LOGICAL VOLUME NUMBERS | PHYSICAL STORAGE APPARATUS PRODUCT NUMBERS |
| 0001 | 1231 |
| 0002 | 1231 |
| 151 | 152 |

(b)

160

| RESOURCE MANAGEMENT INFORMATION (PROCESSOR) | | | |
|---|---|---|---|
| PROCESSOR MANAGEMENT NUMBERS | PROCESSOR PRODUCT NUMBERS | PHYSICAL STORAGE APPARATUS PRODUCT NUMBERS | VIRTUAL STORAGE APPARATUS PRODUCT NUMBERS |
| 0001 | 001 | 1231 | 1111 |
| 0002 | 002 | 1231 | N/A |
| 161 | 162 | 163 | 164 |

| VIRTUAL STORAGE APPARATUS MANAGEMENT INFORMATION | | |
|---|---|---|
| VIRTUAL STORAGE APPARATUS MANAGEMENT NUMBER | VIRTUAL STORAGE APPARATUS PRODUCT NUMBER | PRODUCT NUMBERS OF PHYSICAL STORAGE APPARATUSES WITH VIRTUAL STORAGE APPARATUS OWNER RIGHTS |
| 0001 | 1111 | 1231 |
| 0002 | 2222 | 1241 |
| 171 | 172 | 173 |

(b)

180

| VIRTUAL STORAGE APPARATUS MANAGEMENT INFORMATION (VIRTUAL VOLUMES) | | |
|---|---|---|
| VIRTUAL VOLUME NUMBERS | INTEGRATED POOL VOLUME NUMBERS | VIRTUAL STORAGE APPARATUS PRODUCT NUMBERS |
| 0001 | 0001 | 1111 |
| 0002 | 0002 | 2222 |
| 181 | 182 | 183 |

FIG.11

| | LICENSE INFORMATION UPDATE EVENT | LICENSE INFORMATION TABLE UPDATE ITEM |
|---|---|---|
| 190A | WHEN LICENSE KEY IS REGISTERED | WHOLE LICENSE INFORMATION TABLE OF STORAGE APPARATUS FOR WHICH LICENSE KEY IS REGISTERED |
| 190B | WHEN INTEGRATED POOL CAPACITY UPPER LIMIT WHICH CAN BE USED IS MODIFIED | UPPER LIMIT OF POOL CAPACITY WHICH CAN BE USED BY VIRTUAL DKC |
| 190C | WHEN INTEGRATED POOL USAGE CAPACITY IS MODIFIED | POOL CAPACITY CURRENTLY BEING USED BY VIRTUAL DKC |
| 190D | WHEN POOL CAPACITY UPPER LIMIT WHICH CAN BE USED BY VIRTUAL DKC IS MODIFIED | UPPER LIMIT OF POOL CAPACITY WHICH CAN BE USED BY VIRTUAL DKC |
| 190E | POOL CAPACITY CURRENTLY BEING USED BY VIRTUAL DKC | POOL CAPACITY WHICH IS CURRENTLY BEING USED BY VIRTUAL DKC |
| 190F | PROCESSOR COUNT UPPER LIMIT WHICH CAN BE USED BY VIRTUAL DKC | PROCESSOR COUNT UPPER LIMIT WHICH CAN BE USED BY VIRTUAL DKC |
| 190G | WHEN PROCESSOR COUNT CURRENTLY BEING USED BY VIRTUAL DKC IS MODIFIED | PROCESSOR COUNT WHICH IS CURRENTLY BEING USED BY VIRTUAL DKC |
| 190H | WHEN LICENSE EXPIRY DATE IS MODIFIED | LICENSE EXPIRY DATE |
| 190I | WHEN A STORAGE APPARATUS 2 IS CONNECTED TO STORAGE APPARATUS 1 POSSESSING LICENSE INFORMATION | WHOLE LICENSE INFORMATION TABLE OF STORAGE APPARATUS 2 |
| 190J | WHEN CONNECTION OF STORAGE APPARATUS 2 POSSESSING LICENSE INFORMATION IS BROKEN | WHOLE LICENSE INFORMATION TABLE OF STORAGE APPARATUS 2 |

STORAGE SYSTEM AND LICENSE MANAGEMENT METHOD

TECHNICAL FIELD

The present invention relates to a storage system and license management method and is suitably applied to a storage system which provides virtual storage spanning a plurality of physical storage and to a license management method.

BACKGROUND ART

In recent years, virtualization technology of storage systems has been widely proposed. A plurality of physical storage apparatuses comprising physical storage areas are included in a storage system with progressive virtualization technology. Further, by including, in a storage area which is used by a logical pool built in a physical storage apparatus, a storage area of a logical pool which exists in another physical storage apparatus, a logical pool spanning different physical storage apparatuses can be integrated.

As an example of a technology for creating a large virtual storage area in this way, PTL1 discloses a storage system which provides virtual volumes spanning a plurality of physical storage apparatuses. In the storage system disclosed in PTL1, virtual storage is proposed which is capable of using virtual volumes which are not limited to physical storage apparatus units by building a logical pool spanning a plurality of physical storage apparatuses through the co-operation of physical controllers which are built into the plurality of physical storage apparatuses, and by assigning the logical pool to the virtual volumes.

Further, typically, if a user uses storage provided by a manufacturer, permissions (licenses) for using the storage are required from the manufacturer, and the user is able to use the storage within a scope permitted by the license by using a license key of the license to register the license with the storage. With conventional license registration, licenses assigned to physical storage are managed for each of the physical controllers which control the physical storage and licenses are registered by using a license key for each physical storage.

As an example of technology for managing licenses assigned to storage, PTL2 discloses a storage system which manages licenses in virtual storage. In the storage system disclosed in PTL2, the same license can be used between an upper storage apparatus and a lower storage apparatus by extending the license to the upper storage apparatus and to the lower storage apparatus which is connected to the upper storage apparatus and whose storage area is virtualized by the upper storage apparatus.

CITATION LIST

Patent Literature

[PTL 1]
U.S. Published Patent Application No. 2012/0017042
[PTL 2]
U.S. Published Patent Application No. 2007/0078984

SUMMARY OF INVENTION

Technical Problem

However, in a case where virtual storage is provided through the co-operation of a plurality of physical controllers as per the storage system disclosed in PTL1, because data is migrated across the plurality of physical controllers, licenses cannot be managed for each physical controller corresponding to the storage, as per the prior art.

Further, even when licenses are assigned to a virtual controller which is provided to the user in virtual storage in place of a conventional physical controller, because a virtual controller can easily be added or deleted in a virtual storage environment, a license must be assigned each time a virtual controller is added or removed. Since a license is migrated depending on whether a virtual controller is added or removed, the license key issuing procedure and the re-inputting of the license key to the migration destination must be performed for each physical storage apparatus providing the virtual controller and license management is extremely complicated.

Further, in the storage system disclosed in PTL2, a license is assigned to a physical controller of an upper storage apparatus and to a physical controller of a lower storage apparatus and, although the license is extended to the lower storage apparatus by the controller of the upper storage apparatus, a situation is not assumed where a controller of the upper storage apparatus is added or removed. The storage system of the PTL2 faces the problem that, if the controller of the upper storage apparatus is added or removed, licensing is not possible, and that the lower storage apparatus is unable to use the storage area of the lower storage which has been virtualized by the upper storage apparatus.

The present invention was conceived in view of the foregoing problems and proposes a storage system and a license management method enabling straightforward management of licenses which are assigned to virtual storage spanning a plurality of physical storage.

Solution to Problem

In order to solve this problem, the present invention provides a storage system which manages storage areas respectively provided by a plurality of mutually connected physical storage apparatuses as a logical pool which spans the plurality of physical storage apparatuses, and which provides, to a host computer, virtual storage which is configured from virtual volumes to which the storage areas of the logical pool have been assigned. In this storage system, the physical storage apparatuses comprise a plurality of storage drives comprising physical storage areas; a controller portion which manages storage provided by the physical storage apparatuses; and a license management portion which manages licenses which are assigned to the virtual storage by sharing the licenses between a plurality of the physical storage apparatuses which comprise the virtual storage, wherein the controller portion and the license management portion in the same physical storage apparatus synchronize and retain first information enabling the controller portion to manage the storage and second information enabling the license management portion to manage the license, and wherein, in the plurality of physical storage apparatuses sharing the license, the respective license management portions maintain the second information relating to the license using the same content.

In addition, in order to solve this problem, the present invention provides a license management method for managing licenses assigned to virtual storage in a storage system which manages storage areas respectively provided by a plurality of mutually connected physical storage apparatuses as a logical pool which spans the plurality of physical storage apparatuses, and which provides, to a host computer, virtual storage which is configured from virtual volumes to which the storage areas of the logical pool have been assigned. In this license management method, the physical storage apparatuses comprise a plurality of storage drives comprising physical storage areas; a controller portion which manages storage provided by the physical storage apparatuses; and a license management portion which manages licenses which are assigned to the virtual storage by sharing the licenses between a plurality of the physical storage apparatuses which comprise the virtual storage, the license management method comprising a step in which the controller portion and the license management portion in the same physical storage apparatus synchronize and retain first information enabling the controller portion to manage the storage and second information enabling the license management portion to manage the license; and a step in which, in the plurality of physical storage apparatuses sharing the license, the respective license management portions maintain the second information relating to the license using the same content.

Advantageous Effects of Invention

The present invention enables straightforward management of licenses which are assigned to virtual storage spanning a plurality of physical storage.

BRIEF DESCRIPTION OF DRAWINGS

FIG. 1 is a block diagram showing a configuration of a storage system according to a first embodiment.
FIG. 2 is a block diagram showing an overall configuration of the storage system shown in FIG. 1.
FIG. 3 is a block diagram showing an internal configuration of a host computer.
FIG. 4 is a block diagram showing an internal configuration of a physical storage apparatus.
FIG. 5 is a block diagram showing an internal configuration of a management computer.
[FIG. 6]
FIG. 6 is a table showing an example of a data structure of license information.
FIG. 7 is a table showing an example of a data structure of license sharing information.
[FIG. 8]
FIG. 8 is tables showing examples of data structures of integrated pool management information.
[FIG. 9]
FIG. 9 is tables showing examples of data structures of resource management information.
[FIG. 10]
FIG. 10 is tables showing examples of data structures of virtual storage apparatus management information.
[FIG. 11]
FIG. 11 is an explanatory diagram showing correspondence relationships between update events and update items of license information.
FIG. 12 is a flowchart showing an example of a license restriction determination processing procedure.
FIG. 13 is a sequence diagram showing an example of a license registration processing procedure.
FIG. 14 is a flowchart showing an example of a license key determination processing procedure.
FIG. 15 is a sequence diagram showing an example of processing in a case where a license information update event is generated.
FIG. 16 is a sequence diagram showing an example of a license information lock processing procedure for a plurality of management computers.
FIG. 17 is a sequence diagram showing an example of a license information lock release processing procedure for a plurality of management computers.
FIG. 18 is a sequence diagram showing an example of a processing procedure for adding a license sharing destination.
FIG. 19 is a sequence diagram showing an example of a processing procedure for terminating license sharing.
FIG. 20 is a sequence diagram showing another example of a processing procedure for terminating license sharing.
FIG. 21 is a block diagram showing a configuration of a storage system according to a second embodiment.
FIG. 22 is a block diagram showing an overall configuration of the storage system shown in FIG. 21.
FIG. 23 is a block diagram showing an internal configuration of a centralized management computer.

Figure 1:
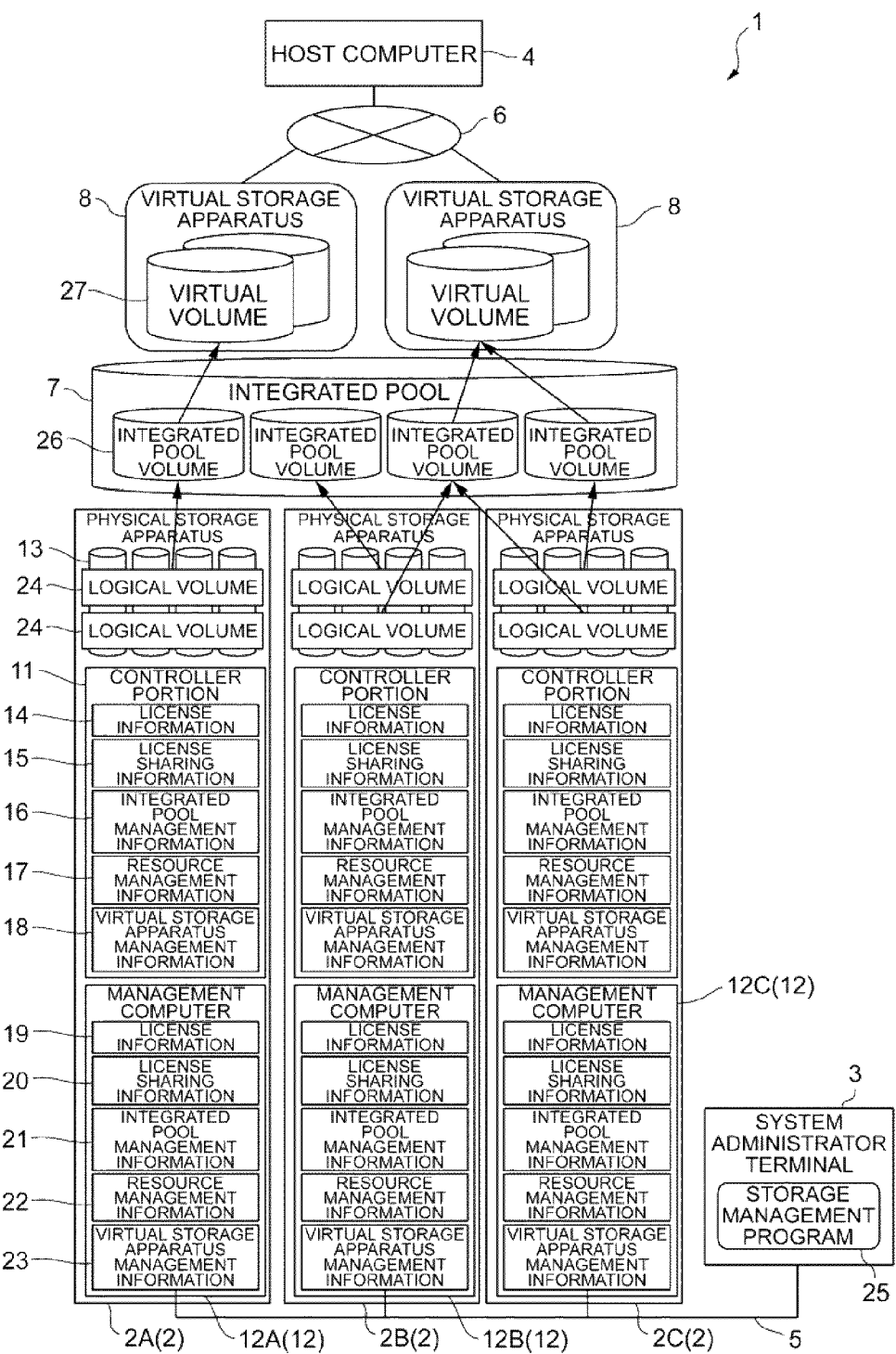
[FIG. 1]

DESCRIPTION OF EMBODIMENTS (1) First Embodiment
The storage system according to a first embodiment of the present invention is a storage system which provides, to a host computer, virtual storage which is configured from virtual volumes which span a plurality of physical storage apparatuses, the physical storage apparatuses comprise a controller portion which manages storage provided by the physical storage apparatuses; and a management computer which manages licenses which are assigned to the virtual storage by sharing the licenses between a plurality of the physical storage apparatuses which comprise the virtual storage, wherein the controller portion and the management computer synchronize and retain the same information, and, in the plurality of physical storage apparatuses to which the same license has been assigned, respective management computers maintain information relating to the license by using the same content.
(1-1) Configuration of the Storage System According to the First Embodiment.
FIG. 1 is a block diagram showing a configuration of the storage system according to the first embodiment. The storage system 1 shown in FIG. 1 is configured comprising a plurality of physical storage apparatuses 2, a system administrator terminal 3, and a host computer 4. Note that, if a plurality of physical storage apparatuses 2 are shown separately, same are written as the physical storage apparatuses 2A, 2B, and 2C and this is the same as the internal configuration of the physical storage apparatus 2 described subsequently. Note that an integrated pool 7 and a virtual storage apparatus 8 shown in FIG. 1 will be described in (1-4) subsequently.

The plurality of physical storage apparatuses 2 and the host computer 4 are connected via a host communication network 6 and the physical storage apparatuses 2 are interconnected so as to be capable of mutual communication via an inter-apparatus communication network (not shown). The system administrator terminal 3 is connected to each physical storage apparatus 2 via a management network 5. The system administrator terminal 3 may also be connected to the host computer 4 via the management network 5.

Figure 2:
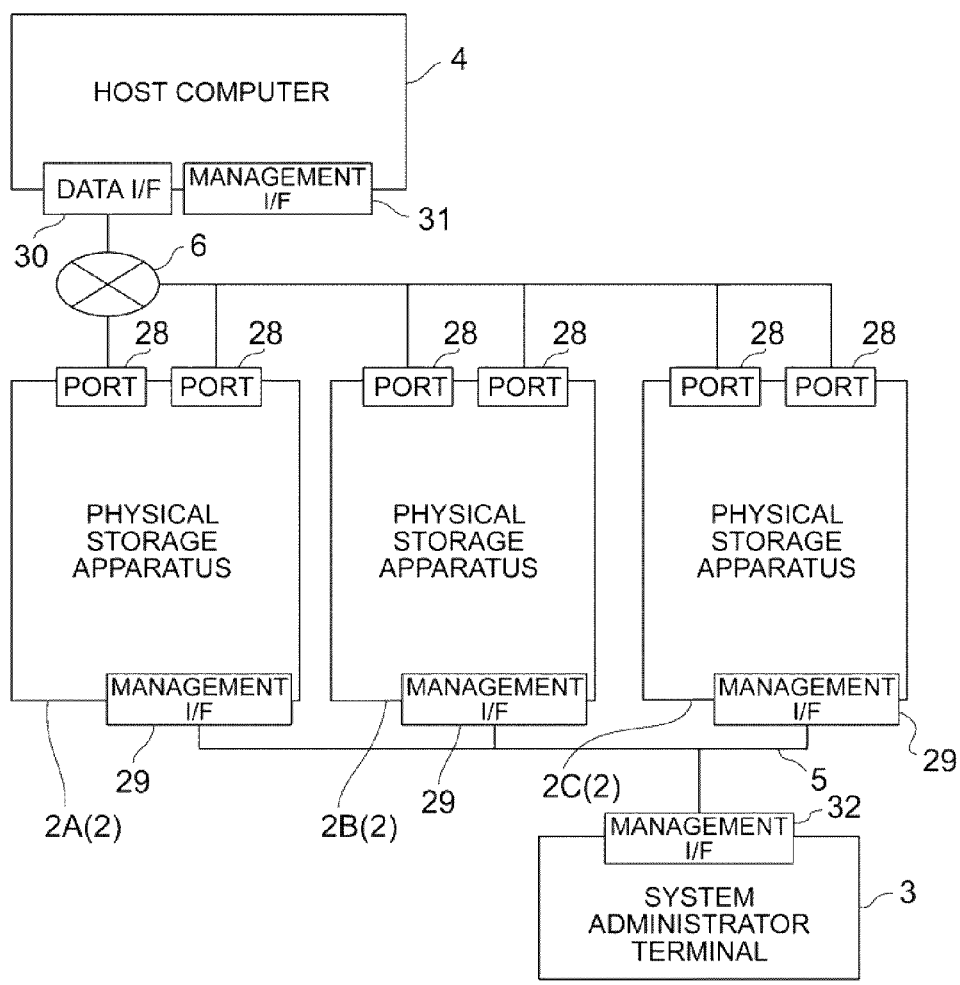
[FIG. 2]
Figure 22:
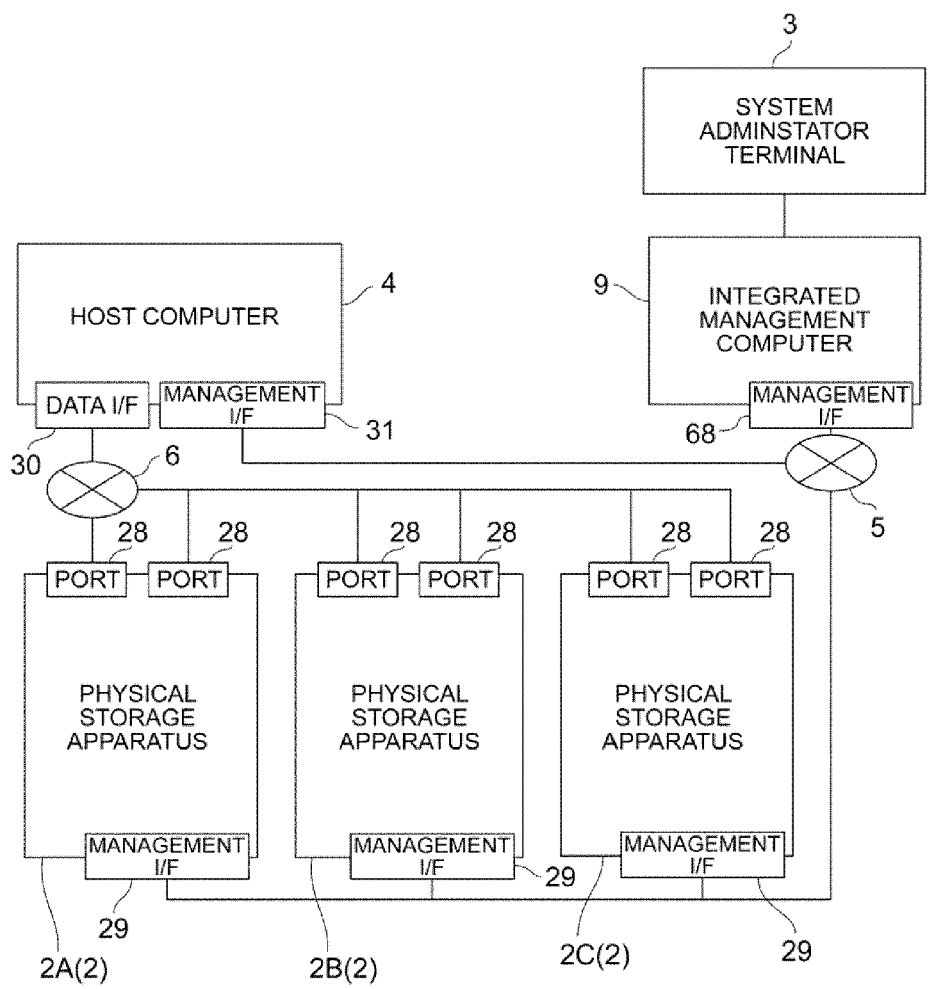
[FIG. 22]

FIG. 2 is a block diagram showing an overall configuration of the storage system shown in FIG. 1. As shown in FIG. 2, the data interface (I/F) 30 of the host computer 4 is connected to each port 28 of the physical storage apparatus 2 via a host communication network 6. Further, a management interface (I/F) 32 of the system administrator terminal 3 is connected to each management interface I/F 29 of the physical storage apparatus 2 via the management network 5. Note that an example is shown in FIG. 22, described subsequently, of a case where the system administrator terminal 3 is connected to the physical storage apparatuses 2 and the host computer 4 via the management network 5.

The management network 5 is configured from a LAN (Local Area Network), for example. The system administrator terminal 3 collects information from the physical storage apparatuses 2 and the host computer 4 via the management network 5 and makes variously configures the physical storage apparatuses 2 and the host computer 4.

The host communication network 6 is configured from a SAN (Storage Area Network), for example. The host computer 4 exchanges commands such as I/O requests as well as various data with the physical storage apparatuses 2 via the host communication network 6. The inter-apparatus communication network is also configured from a SAN. Each of the physical storage apparatuses 2 transfers I/O requests from the host computer 4 to the other physical storage apparatuses 2 via the inter-apparatus communication network ad exchanges data with the other physical storage apparatuses 2. Note that the host communication network 6 may also be configured comprising an inter-apparatus communication network.

(1-2) Host Computer and System Administrator Terminal

Figure 3:
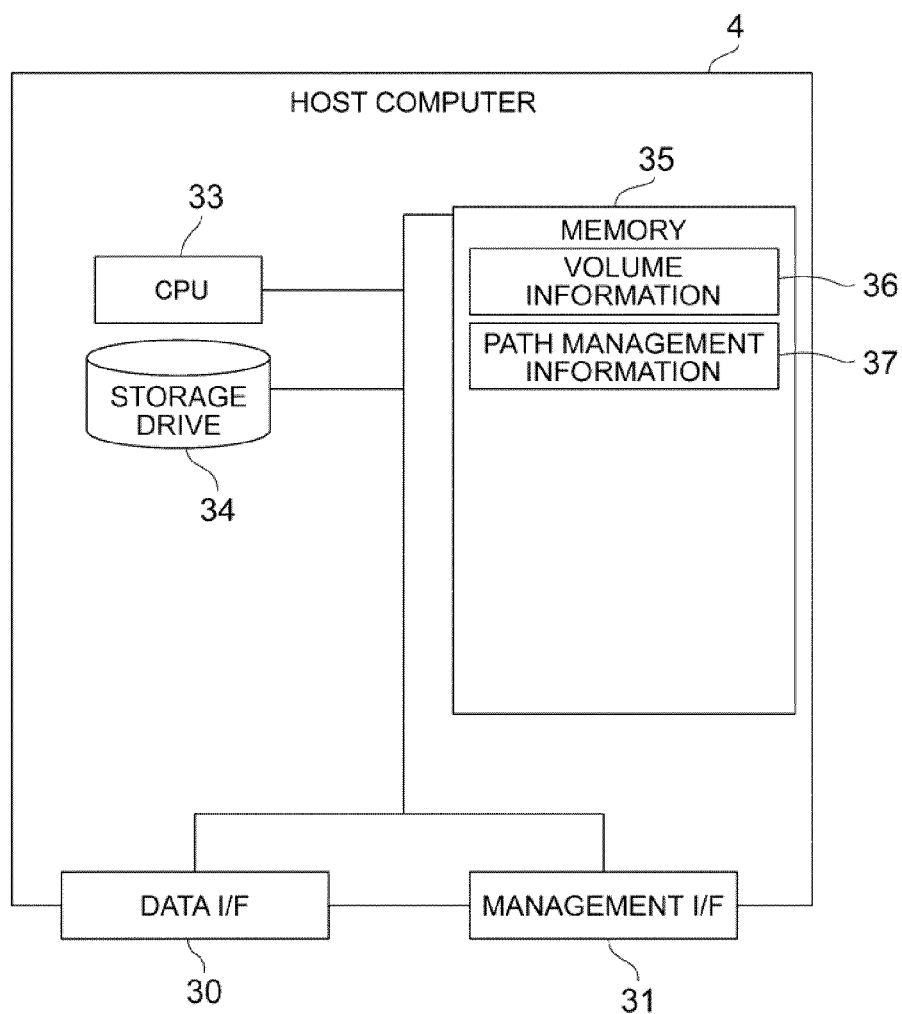
[FIG. 3]

FIG. 3 is a block diagram showing an internal configuration of the host computer. As shown in FIG. 3, the host computer 4 is configured such that a CPU (Central Processing Unit) 33, a storage drive 34, a memory 35, a data I/F 30, and a management I/F 31 are connected via an internal bus.

The CPU 33 is a processor which governs the overall operational control of the host computer 4 and which reads programs stored on the storage drive 34 and, where necessary, executes the read programs.

The storage drive 34 is configured from a high-cost disk device such as a SCSI (Small Computer System Interface) disk or a low-cost disk device such as a SATA (Serial AT Attachment) disk or an optical disk, for example.

In addition to being used to hold various programs and various data which are read from the storage drive 34, the memory 35 is also used as a working memory of the CPU 33. For example, the memory 35 stores volume information 36 and path management information 37. The volume information 36 is information which is related to a virtual volume 27 which is provided to the host computer 4. Further, the path management information 37 is information for managing a plurality of paths which are configured between the host computer 4 and the plurality of physical storage apparatuses 2 comprising the virtual storage apparatus and is referenced in order to select the access path if an I/O request is issued from the host computer 4 to the virtual storage apparatus, for example.

The data I/F 30 is, as shown in FIG. 2, an interface for sending and receiving commands such as I/O requests from the host computer 4, and various data. The management I/F 31 is an interface for transmitting information to the system administrator terminal 3 and for sending and receiving signals relating to various settings via the management network 5.

Note that the system administrator terminal 3 shown in FIG. 1 may also be realized by a computer which comprises the same hardware configuration as the host computer 4. In the system administrator terminal 3, the storage management program 25 which is stored in the storage drive is read to the memory and executed by the CPU. The management program 25 is a program for managing the correspondence relationships, with each of the parts of the physical storage apparatuses 2, of the virtual storage apparatus 8 which is built by the plurality of physical storage apparatuses 2 and the virtual volume 27 which is defined in the virtual storage apparatus 8 and provided to the host computer 4.

(1-3) Physical Storage Apparatus

The physical storage apparatuses 2 (2A to 2C) are, as shown in FIG. 1, configured comprising a controller portion 11, a management computer 12, and a plurality of storage drives 13. The controller portion 11 is a physical controller which manages the physical storage and virtual storage provided by the physical storage apparatuses 2. Further, the management computer 12 is an example of a license management portion which manages licenses assigned to virtual storage spanning the plurality of physical storage apparatuses 2 such that the licenses are shared by the plurality of physical storage apparatuses 2 comprising the virtual storage.

As shown in FIG. 1, the controller portion 11 and the management computer 12 each hold name information (license information, license sharing information, integrated pool management information, resource management information, and virtual storage apparatus management information). This information is information which is related to the configuration of the virtual storage provided to the host computer 4 by the plurality of physical storage apparatuses 2 and information for shared management of licenses between the plurality of physical storage apparatuses 2 and will be described in detail subsequently with reference to FIGS. 6 to 10. The configuration of the physical storage apparatuses 2 will be described in detail hereinbelow.

(1-3-1) Configuration of Physical Storage Apparatus

Figure 4:
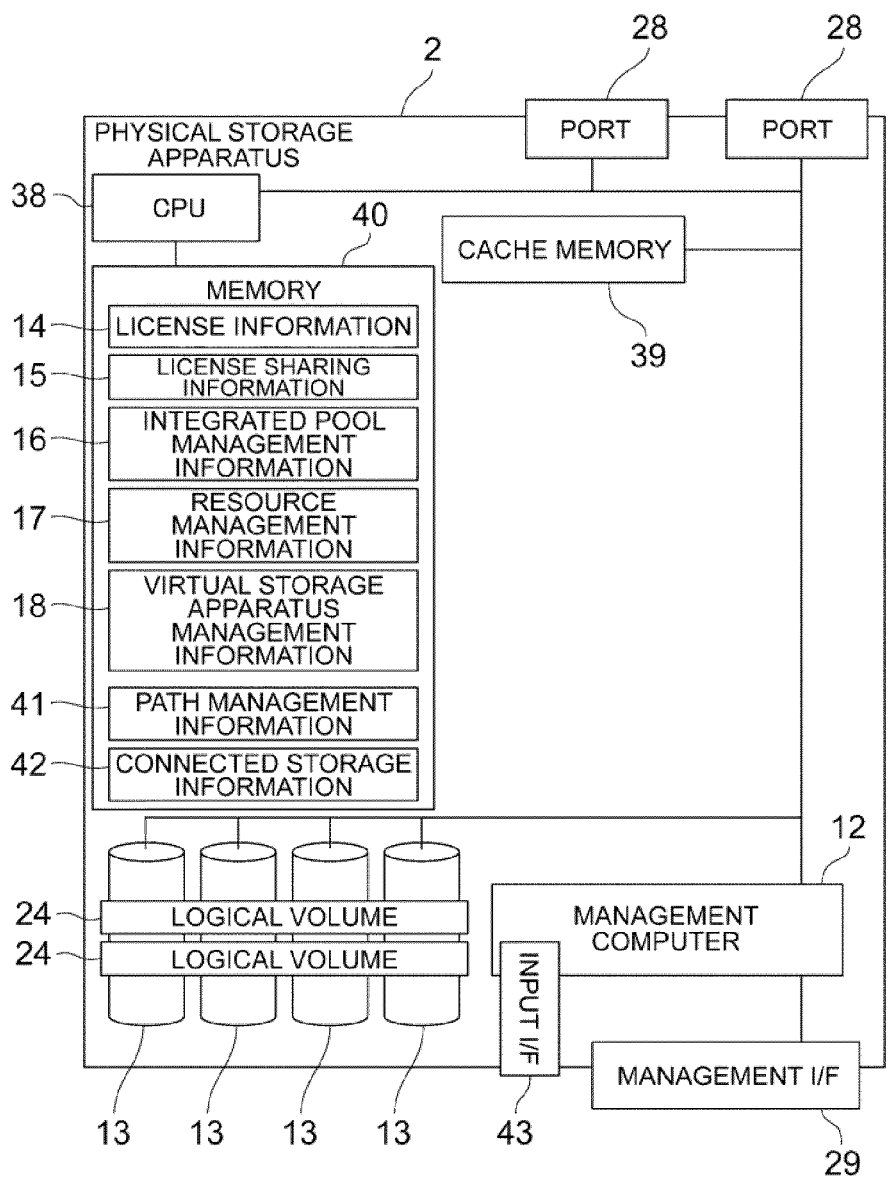
[FIG. 4]

FIG. 4 is a block diagram showing an internal configuration of the physical storage apparatus. As shown in FIG. 4, the physical storage apparatus 2 is configured by connecting, via an internal bus, a CPU 38, a cache memory 39, a memory 40, a plurality of storage disks 13, a management computer 12, a port 28, a management I/F 29, and an I/O I/F 43.

The CPU 38 is a processor which governs the operational control of the whole physical storage apparatus 2 and which reads the programs stored on the storage drives 13 and, where necessary, executes the read programs. The cache memory 39 is mainly a memory which is used in order to temporarily store data which is read from and written to the storage drives 13.

In addition to being used to store various programs which are read from the storage drives 13, the memory 40 is also used as a working memory of the CPU 38. The license information 14, license sharing information 15, integrated pool management information 16, resource management information 17, virtual storage apparatus management information 18, path management information 41, and connected storage information 42 are also stored in the memory 40.

The path management information 41 is information for managing a plurality of paths which are configured between the host computer 4 and the plurality of physical storage apparatuses 2 which comprise the virtual storage apparatus and is the same information as the path management information 37. Further, the storage information 42 is information which is related to the logical volume 24, the integrated pool volume 26, and the virtual volume 27 and so on which are associated with the storage area provided by the storage devices 13 of the physical storage apparatus 2.

The storage drives 13 are configured, for example, from high-cost disk devices such as a SCSI (Small Computer System Interface) disks or low-cost disk devices such as SATA (Serial AT Attachment) disks or optical disks, for example. One or more logical volumes 24 are configured on storage areas provided by the storage drives 13. Note that the storage drives 13 can be replaced with RAID (Redundant Arrays of Inexpensive Disks) groups. A RAID group refers to an aggregate of a plurality of storage drives with the same type of physical characteristics such as disk speed. In this case, the CPU 38 manages storage areas, which are provided by the plurality of storage drives 13 comprising a single RAID group as a storage area which is provided by a single storage drive 13, and configures one or more logical volumes 24 on the storage area.

The port 28 is a port which is used when sending/receiving commands or various data I/Os with other physical storage apparatuses 2 or the host computer 24. The management I/F 29 is an interface for transmitting information to the system administrator terminal 3 via the management network 5 and sending and receiving signals related to various settings. Further, the I/O I/F 43 is an interface for sending/receiving commands from the management computer 12 or various data I/Os which will be described subsequently.

In the physical storage apparatus 2, as a result of the memory 40 storing the foregoing various information and the CPU 38 executing programs, the controller portion 11 performs management of the storage provided by the physical storage apparatus 2. Note that the controller portion 11 may also manage the storage in accordance with an instruction from the storage management program 25 which is executed by the system administrator terminal 3.

(1-3-2) Configuration of Management Computer

Figure 5:
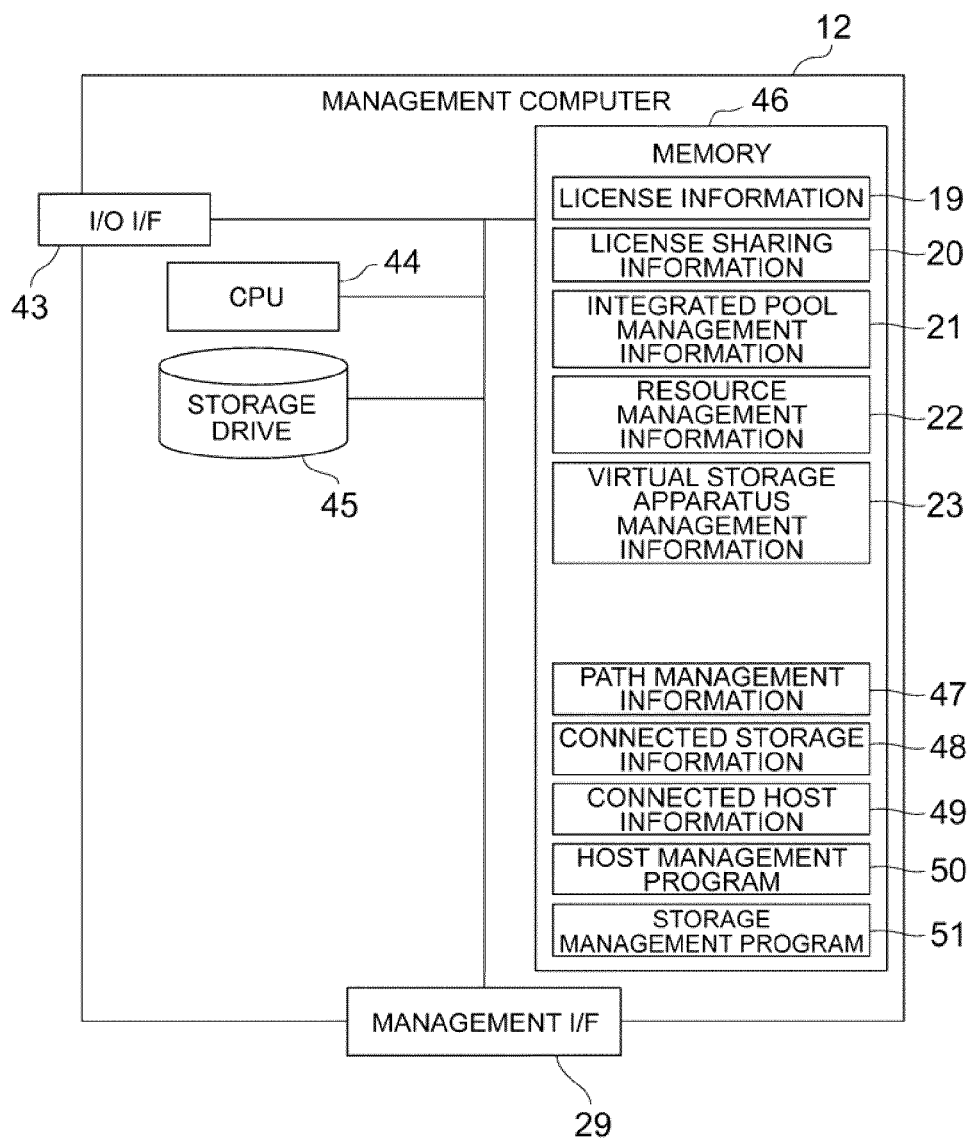
[FIG. 5]

FIG. 5 is a block diagram showing an internal configuration of the management computer. As shown in FIG. 5, the management computer 12 is configured such that a management I/F, the I/O I/F 43, a CPU 44, a storage drive 45, and a memory 46 being connected via an internal bus.

The CPU 44 is a processor which governs the operational control of the whole management computer 12, and which reads programs stored on the storage drive 45 to the memory 46, and, where necessary, executes the read programs. The storage drive 45 is configured, for example, from a high-cost disk device such as a SCSI (Small Computer System Interface) disk or a low-cost disk device such as a SATA (Serial AT Attachment) disk or optical disk, for example, and stores various programs and data.

In addition to being used to store various programs which are read from the storage drives 13, the memory 46 is also used as a working memory of the CPU 44. As shown in FIG. 5, the memory 46 stores and holds license information 19, license sharing information 20, integrated pool management information 21, resource management information 22, virtual storage apparatus management information 23, path management information 47, connected storage information 48, connected host information 49, a host management program 50, and a storage management program 51.

The path management information 41 and connected storage information 48 are the same information as the path management information 41 and connected storage information 42 which are stored in the memory 40 of the physical storage apparatuses 2. The host management program 50 is a program for managing the host computer 4 which is connected to an own physical storage apparatus 2 and the connected host information 49 is information which is related to the host computer 4 which is required when executing the host management program 50.

The storage management program 51 is a program for performing management of the storage provided by its own physical storage apparatus 2 and for performing management of the licenses shared by its own physical storage apparatus and the other physical storage apparatuses 2. In the management computer 12, each of the processes described subsequently in FIGS. 12 to 20 for the whole management computer 12 are performed as a result of the CPU 44 executing the storage management program 51 stored in the memory 46 and licenses are managed by being shared with the other physical storage apparatuses 2.

(1-4) Logical Configuration of the Storage System

The logical configuration of the storage system 1 will be described hereinbelow. In the storage system 1, the logical volume 24 in each physical storage apparatus 2 is integrated with the physical storage apparatuses 2 and the integrated logical volumes are managed as a logical pool (hereinafter called the integrated pool 7) which spans the plurality of physical storage apparatuses 2. The integrated pool 7 is configured as an aggregate of the logical pool volume 26 which is associated with the logical volume 24 of the plurality of physical storage apparatuses 2. Further, the integrated pool 7 may also be created in a plurality.

The storage area of the integrated pool 7 (more specifically, the integrated pool volume 26) is assigned to the integrated pool 7 and the virtual volume 27 is created. Therefore, the virtual volume 27 is a virtual storage area which spans the plurality of physical storage apparatuses 2. Further, in the storage system 1, a virtual storage (hereinafter called a virtual storage apparatus 8) which comprises one or more virtual volumes 27 is built by the plurality of physical storage apparatuses 2 which are connected via an inter-apparatus communication network, and is provided to the host computer 4.

Therefore, in the storage system shown in FIG. 1, the host computer 4 identifies the plurality of physical storage apparatuses 2 which are connected via the inter-apparatus communication network as virtual storage and identifies the virtual volume 27 as a virtual storage area which is provided by the virtual storage apparatus 8. Thereupon, any one path among the plurality of paths which are configured between the host computer 4 and the plurality of physical storage apparatuses 2 which comprise the virtual storage apparatus 8 is selected as an access path and the host computer 4 is notified. Thus, the host computer 4 sends and receives commands such as write requests and read requests and data to and from the virtual storage apparatus 8 via the access path thus notified.

The processing of the virtual storage apparatus 8 is controlled by the virtual disk controller (DKC) which is provided by the controller portion 11 of the physical storage system. The processor of the physical storage apparatus (the CPU 38, for example) is assigned from the controller portion 11 to the virtual DKC, and the virtual DKC is able to implement control of the virtual volume 27 through the operation of the processor, and remove the pool from the integrated pool volume 26 corresponding to the virtual volume 27, for example, and read and write data from and to the removed pool.

(1-5) Various Information for License Sharing or Storage Management

Information relating to the configuration of the virtual storage provided to the host computer 4 by the plurality of physical storage apparatuses 2 as well as various information for performing shared management of licenses with the plurality of physical storage apparatuses 2 will be described next.

The various information is information held by the controller portion 11 and the management computer 12 shown in FIG. 1, and the license information 14, the license sharing information 15, the integrated pool management information 16, the license management information 17, and the virtual storage apparatus management information 18, which are held by the controller portion 11, and the name information held by the management computer 12 (the license information 19, the license sharing information 20, the integrated pool management information 21, the resource management information 22, and the virtual storage apparatus management information 23) are the same information respectively and synchronized. That is, if any of the information in either of the controller portion 11 and the management computer 12 is created or updated, the same information is created or updated on the other.

More specifically, for example, when the controller portion 11 updates the configuration of the virtual storage, the data of the virtual storage apparatus management information 18 is updated and, in keeping with this update, the virtual storage apparatus management information 23 is updated in the management computer 12 using the updated virtual storage apparatus management information 18. Further, for example, when the management computer 12 registers a license with an own physical storage apparatus 2, license information 19 is created, and, in keeping with this creation, license information 14 which is the same as the created license information 19 is created by the controller portion 11.

By synchronizing the information held by the controller portion 11 and the management computer 12 in this way, the controller portion 11 and the management computer 12 are also able to perform their own management while copying the modified content of various information by way of mutual control. For example, if the configuration of virtual storage is modified by the controller portion 11, the management computer 12 manages the sharing of the licenses in correspondence with the configuration of the modified virtual storage, and thus the controller portion 11 is able to use a license on the modified virtual storage without any change since before the virtual storage configuration was modified.

Various information which is held by the controller portion 11 and the management computer 12 will be described hereinbelow with reference to FIGS. 6 to 10. The various information which is shown in FIGS. 6 to 10 is shared by the plurality of physical storage apparatuses 2 where the same license is registered. Note that a case where various information is in table format will be described in the following description but the data format of the various information is not limited to table format.

FIG. 6 is a table showing an example of the data structure of the license information. The license information is information indicating content restricted by the license and the current usage status of a license which is registered in the own physical storage apparatus 2. The license information 110 shown in FIG. 6 corresponds to the license information 14, 19 shown in FIG. 1. The license information 110 is configured from a license name field 111, a creatable pool capacity upper limit field 112, a created pool capacity field 113, a usable processor count upper limit field 114, an used processor count field 115, and a license expiry date field 116.

The license name field 111 includes the name of the license registered for the physical storage apparatus 2. The creatable pool capacity upper limit field 112 contains an upper limit value for the pool capacity for which creation is allowed by the license and the created pool capacity field 113 contains the capacity value of the currently created pool capacity (removed by the virtual DKC). Note that the current created pool capacity is equivalent to the total of the pool capacity which is created through access from the plurality of physical storage apparatuses 2 sharing the license.

Furthermore, the usable processor count upper limit field 114 contains the upper limit value of the processor count which can be used by the virtual DKC permitted by the license and the used processor count field 115 contains the processor count currently being used by the virtual DKC. Note that the processor count currently being used by the virtual DKC corresponds to the total number of processors, used by the virtual DKC in the virtual storage apparatus 8, among the processors of the plurality of physical storage apparatuses 2 sharing the license.

The license expiry date field 116 contains the expiry date of the license. If the license comprises a predetermined expiry date (twelve months, for example), the license expiry date field 116 contains a day and month which is twelve months after the initial registration time of the license. Further, if the license has an expiry date which is indicated by a predetermined range (twelve to twenty-four months, for example) as in the case of a term license, the license expiry date field 116 contains a day and month which is twelve months after the initial registration time of the license as an "initial validity date" and a day and month which is twenty-four months after the initial registration time as a "final validity date," for example.

Figure 7:
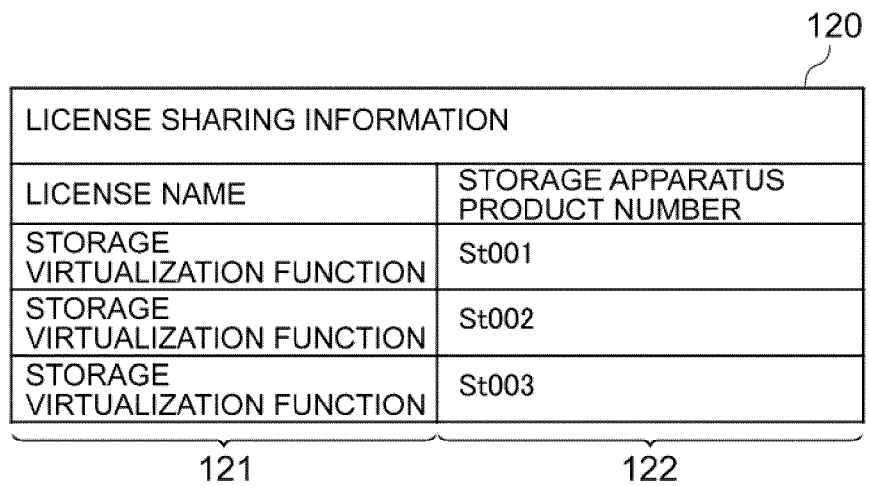
[FIG. 7]

FIG. 7 is a table showing an example of a data structure of license sharing information. The license sharing information is information indicating the correspondence relationship between the license and the physical storage apparatuses 2 sharing the license. The license sharing information 120 shown in FIG. 7 corresponds to the license information 15, 20 shown in FIG. 1. The license sharing information 120 is configured comprising a license name 121 and a storage apparatus product number field 122. The license name field 121 contains the names of the licenses registered for the physical storage apparatuses 2. The license name field 121 corresponds to the license name field 111 of the license information 110. The storage apparatus product number field 122 contains the product numbers of all the physical storage apparatuses 2 sharing the license.

FIG. 8 is tables showing an example of the data structure of the integrated pool management information. The integrated pool management information includes information relating to the integrated pool 7, the integrated pool management information 130 shown in FIG. 8A contains data related to individual integrated pool volumes 26 of the integrated pool 7, and the integrated pool management information 140 shown in FIG. 8B contains data related to the integrated pool 7. The integrated pool management information 130 and 140 correspond to the integrated pool management information 16, 21 shown in FIG. 1.

The integrated pool management information 130 is configured comprising an integrated pool volume number field 131, a logical volume number field 132, and an integrated pool number field 133. The integrated pool volume number field 131 contain integrated pool volume numbers which uniquely identify the integrated pool volumes 26. The logical volume number field 132 contains logical volume numbers which uniquely identify the logical volumes 24 which are associated with the integrated pool volumes 26 specified by the integrated pool volume numbers contained in the integrated pool volume number field 131, and the integrated pool number field 133 contains integrated pool numbers which uniquely identify the integrated pools 7 comprising the integrated pool volumes 26.

The integrated pool management information 140 is configured comprising an integrated pool number field 141, and an integrated pool owner rights physical storage apparatus product number field 142. The integrated pool number field 141 corresponds to the integrated pool number field 133 of the integrated pool management information 130 and contains integrated pool numbers which uniquely identify the integrated pools 7. Further, the integrated pool owner rights physical storage apparatus product number field 142 contains the product numbers of the physical storage apparatuses 2 which own owner rights to the pools 7.

FIG. 9 is tables showing an example of a data structure of resource management information. The resource management information includes information relating to the resources of a single physical storage apparatus 2 (physical volumes, logical volumes, and processor and the like), and the resource management information 150 shown in FIG. 9A contains the correspondence relationships between the logical volume 24 and the storage drives 13, and the resource management information 160 shown in FIG. 9B contains the correspondence relationships between the processors used by the virtual DKC and the physical storage apparatuses 2 and the virtual storage apparatus 8. The resource management information 150 and 160 correspond to the resource management information 17 and 22 shown in FIG. 1.

The resource management information 150 is configured comprising a logical volume number field 151 and a physical storage apparatus product number field 152. The logical volume number field 151 contains logical volume numbers which uniquely identify the logical volumes 24 and the physical storage apparatus product number field 152 contains product numbers of the physical storage apparatuses 2 comprising the storage drives 13 providing the storage areas created by the logical volumes 24.

The resource management information 160 is configured comprising a processor management number field 161, a processor product number field 162, a physical storage apparatus product number field 163 and a virtual storage apparatus product number field 164. The processor management number field 161 contains management numbers which are assigned on a one-to-one basis to processors in order to manage a plurality of processors. The processor product number field 162 contains the product numbers of the processors indicated by the processor management numbers contained in the processor management number field 161, the physical storage apparatus product number field 163 contains the product numbers of the physical storage apparatuses comprising the processors, and the virtual storage apparatus product number field 164 contains the product numbers of the virtual storage apparatuses 8 causing the processor to operate. Note that, in cases where a product number has not been assigned to a virtual storage apparatus 8 or where the processor is not operated by the virtual storage apparatus 8 or the like, the virtual storage apparatus product number field 164 contains "N/A" which indicates that a corresponding product number does not exist.

FIG. 10 is tables showing examples of data structures of virtual storage apparatus management information. The virtual storage apparatus management information comprises information relating to the virtual storage apparatus 8, where the virtual storage apparatus management information 170 shown in FIG. 10A contains correspondence relationships between the virtual storage apparatuses 8 and the physical storage apparatuses 2 which possess the apparatus owner rights of the virtual storage apparatuses 8, and the virtual storage apparatus management information 180 shown in FIG. 10B contains data relating to the virtual volumes 27 defined in the virtual storage apparatus 8. The virtual storage apparatus management information 170 and 180 correspond to the virtual storage apparatus management information 18 and 23 shown in FIG. 1.

The virtual storage apparatus management information 170 is configured comprising a virtual storage apparatus management number field 171, a virtual storage apparatus product number field 172, and a physical storage apparatus product number field 173 which possesses virtual storage apparatus owner rights. The virtual storage apparatus management number field 171 contains management numbers which are assigned on a one-to-one basis of the virtual storage apparatus 8 in order to manage a plurality of virtual storage apparatuses 8. The virtual storage apparatus product number field 172 contains the product numbers of the virtual storage apparatuses 8 indicated by the virtual storage apparatus numbers contained in the virtual storage apparatus management number field 171 and the physical storage apparatus product number field 173 which possesses virtual storage apparatus owner rights contains product numbers of the physical storage apparatuses 2 which possess the owner rights to the virtual storage apparatuses 8.

The virtual storage apparatus management information 180 is configured comprising a virtual volume number field 181, an integrated pool volume number field 182, and a virtual storage apparatus product number field 183. The virtual volume number field 181 contains virtual volume numbers which uniquely identify the virtual volumes 27. The integrated pool volume number field 182 contains integrated pool volume numbers which uniquely identify the integrated pool volumes 26 which are associated with the virtual volume 27 for the virtual volumes 27 indicated by the virtual volume management numbers contained in the virtual volume number field 181. Further, the virtual storage apparatus product number field 183 contains the product numbers of the virtual storage apparatuses 8 defining the virtual volumes 27.

Various information shown in FIGS. 6 to 10 is shared by the plurality of physical storage apparatuses 2, and various information is suitably updated according to changes in the status of the storage system 1. More specifically, the integrated pool management information 130 and 140, the resource management information 150 and 160, and the virtual storage apparatus management information 170 and 180 shown in FIGS. 8 to 10 are updated in cases where a virtual storage environment built by the physical storage apparatus 2 is updated and in cases where the relationship with the host computer is changed.

Furthermore, the license information 110 shown in FIG. 6 is updated in response to a predetermined event, i.e. if a license registration state, the defined content of the license, or the usage status of a pool or processors associated with the license, in a plurality of physical storage apparatuses 2, is modified and the license sharing information 120 shown in FIG. 7 is updated according to an update to the license information 110.

FIG. 11 is an explanatory diagram showing the correspondence relationships between license information update events and update items. In FIG. 11, a license information update event field 191 includes events for updating the content of the license information 110 and a license information table update item field 192 includes table items of the license information 110 which is updated in response to the update events contained in the license information update event field 191. It can be seen that, if a license key is registered for a physical storage apparatus 2 in the first row (entry 190A) in FIG. 11, all the table events of the license information 110 of the storage apparatuses 2 where the license key has been registered are updated. Further, it can be seen that, if the permitted amount defined by the license for the pool capacity upper limit value or processor count is changed or if the resource amount and so on currently being used is changed in the second to seventh rows (entries 190B to 190G) of FIG. 11, the items of the license information 110 are updated according to the respective modified content or changes. Furthermore, it can be seen that, if the license expiry date is changed in the eighth row of FIG. 11 (entry 190H), the license expiry data in the license expiry date field 116 of the license information 110 is updated. Further, it can be seen that, if a physical storage apparatus 2C with an unregistered license is newly connected to the physical storage apparatuses 2A and 2B with registered licenses, for example, in the ninth row (entry 190I) of FIG. 11, all the table items of the license information 110 of the physical storage apparatus 2C are updated. In addition, it can be seen that, if the connection of the physical storage apparatus 2B is removed from the license-registered physical storage apparatuses 2A, 2B, and 2C, for example, in the tenth row (entry 190J) of FIG. 11, all the table items of the license information 110 of the physical storage apparatus 2B are updated.

(1-6) Processing for Performing Shared Management of Licenses

Processing for sharing the same licenses assigned across the plurality of physical storage apparatuses 2 in the storage system 1 shown in FIG. 1 will be described hereinbelow with reference to FIGS. 12 to 20. In FIGS. 12 to 20, if there is no need to show the physical storage apparatuses 2 individually, language such as "the management computers 12 of the physical storage apparatuses 2 reference the license information 19" is used, but if showing the physical storage apparatuses 2 individually is required, this is written as using the physical storage apparatuses 2A, 2B, and 2C shown in FIG. 1, and the constituent elements of each of the physical storage apparatuses 2A to 2C are described by assigning the same indices, i.e. the management computers 12A to 12C and license information 19A to 19C.

(1-6-1) Determination of License Restrictions

First, license restriction determination processing which confirms the statuses of the licenses registered for the license-registered physical storage apparatuses 2 will be described. The license restriction determination is processing which is implemented by executing a program (the storage management program 51, for example) of the management computer 12 of the license-registered physical storage apparatuses 2. The license restriction determination processing may be executed at regular intervals, and if an operation of the virtual storage apparatus 8 to which a license is assigned is generated, may be executed before the operation is started. Furthermore, [the license restriction determination processing] may also be executed with the update timing of the license information 110 in response to the license information updates shown in FIG. 11.

Figure 12:
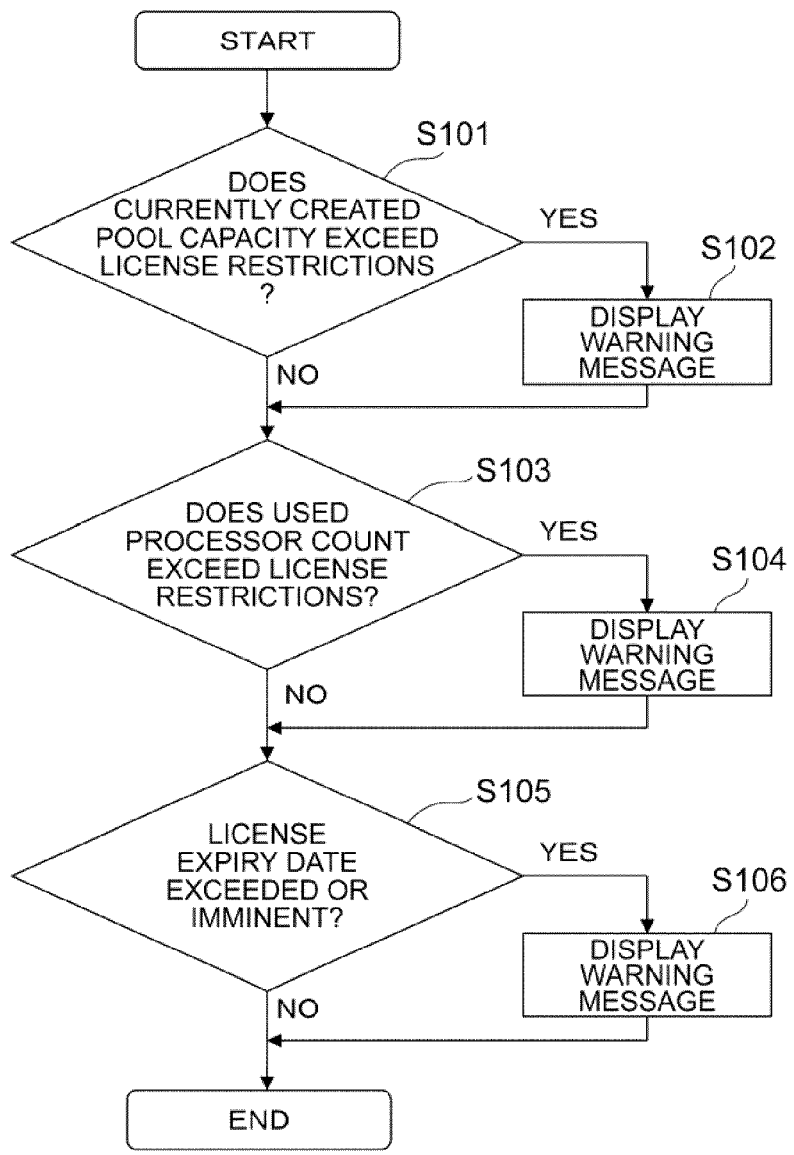
[FIG. 12]

FIG. 12 is a flowchart showing an example of a license restriction determination processing procedure. First, the management computer 12 references the license information 19 stored in the memory 46 and performs the processing of the steps S101 to S105, described subsequently, for each license contained in the license name field 111.

In step S101, the management computer 12 determines whether the currently created pool capacity exceeds the license restrictions, that is, whether the capacity value contained in the created pool capacity field 113 exceeds the upper limit value for the pool capacity contained in the creatable pool capacity upper limit field 112. If the capacity value contained in the created pool capacity field 113 exceeds the upper limit value for the pool capacity contained in the creatable pool capacity upper limit field 112 (YES in step S101), the management computer 12 transmits a warning message indicating that the currently created pool capacity exceeds the license restrictions to the system administrator terminal 3 (step S102). The system administrator terminal 3 which receives the warning message notifies the system administrator that the pool creation capacity exceeds the limit value of the license by displaying a predetermined warning message on a screen, for example. In addition, the management computer 12 may make settings so that user usage of the virtual storage corresponding to the license is not permitted until the capacity value contained in the created pool capacity field 113 is no more than the capacity value contained in the creatable pool capacity upper limit field 112. The processing to make the setting denying usage of the storage corresponding to the license may also be performed similarly in steps S104 and S106, described subsequently.

The management computer 12 performs the processing of step S103 if the capacity value contained in the created pool capacity field 113 is no more than the upper limit value for the pool capacity contained in the creatable pool capacity upper limit field 112 in step S101 (NO in step S101) or after the processing of step S102 ends. In step S103, the management computer 12 determines whether the processor count used by the virtual DKC exceeds the license restrictions, that is, whether the processor count contained in the used processor count field 115 exceeds the upper limit value contained in the usable processor count upper limit field 114 (step S103). If the processor count contained in the used processor count field 115 exceeds the upper limit value contained in the usable processor count upper limit field 114 (YES in step S103), the management computer 12 transmits a warning message indicating that the processor count used by the virtual DKC exceeds the license restrictions to the system administrator terminal 3 (step S104). The system administrator terminal 3 which receives the warning message notifies the system administrator that the processor usage count exceeds the limit value of the license by displaying a predetermined warning message on the screen, for example.

The management computer 12 performs the processing of step S105 If the processor count contained in the used processor count field 115 is no more than the upper limit value contained in the usable processor count upper limit field 114 in step S103 (NO in step S103) or after the processing of step S104 ends. In step S105, the management computer 12 determines whether the license expiry date has been exceeded or if the license expiry date is imminent (step S105). More specifically, the management computer 12 acquires the current date and time from an internal configuration comprising a clock function (not shown) and determines whether the current date and time exceeds the license expiry date contained in the license expiry date field 116 or is close to this expiry date. It is determined whether the current date and time is close to the expiry date by determining whether the time from the current date and time until the expiry date is no more than a predetermined reference time (one month, for example), and this reference time may have a fixed value which is preset in the memory 46 of the management computer 12 or may be set by the system administrator via the system administrator terminal 3.

If the current date and time exceeds the expiry date contained in the license expiry date field 116 or is close to the expiry date in step S105 (YES in step S105), the management computer 12 transmits a warning message indicating that the license expiry date has been exceeded or is imminent to the system administrator terminal 3 (step S106).

Further, in steps S105 to S106, in a case where the license is a term license with an expiry term which is indicated by a predetermined range (twelve to twenty-four months, for example), as described above in FIG. 6, the license expiry date field 116 contains two expiry dates which are an "initial expiry date" and a "final expiry date," and hence the management computer 12 may perform a determination to compare the current date and time with both the "initial expiry date" and the "final expiry date" and may transmit a warning message according to the determination result.

The system administrator terminal 3 which receives the warning message in step S106 notifies the system administrator that the license expiry has been exceeded or is imminent by displaying a predetermined warning message on the screen, for example. Further, if the current date and time is not close to the expiry date contained in the license expiry date field 116 in step S105 (NO in step S105) or after the processing of step S106 is complete, the management computer 12 ends the processing to determine the license restrictions of the license.

If no processing to display a warning message has been performed at all by the processing of steps S101 to S106 above, the management computer 12 permits usage of the virtual storage 8 corresponding to the license. More specifically, if, for example, a pool assigned to a virtual volume 27 by the virtual storage apparatus 8 is added, [the management computer 12] executes the foregoing processing of steps S101 to S106. Here, if it is determined that the pool capacity or the like does not exceed the upper limit value restricted by the license in step S101, that the processor usage count does not exceed the upper limit count in step S103, and that the license expiry date has not been exceeded in step S105, the management computer 12 permits adding of a pool and the controller portion 11 performs processing to add a pool which is assigned to the virtual volume 27 in accordance with the determination by the management computer 12.

Further, in steps S101 and S103, if it is determined that the pool capacity or processor count has not exceeded the license restriction but is close to the license restriction, processing to notify the system administrator terminal 3 of the remaining pool capacity and the processor count may be executed.

(1-6-2) License Registration Processing

Figure 13:
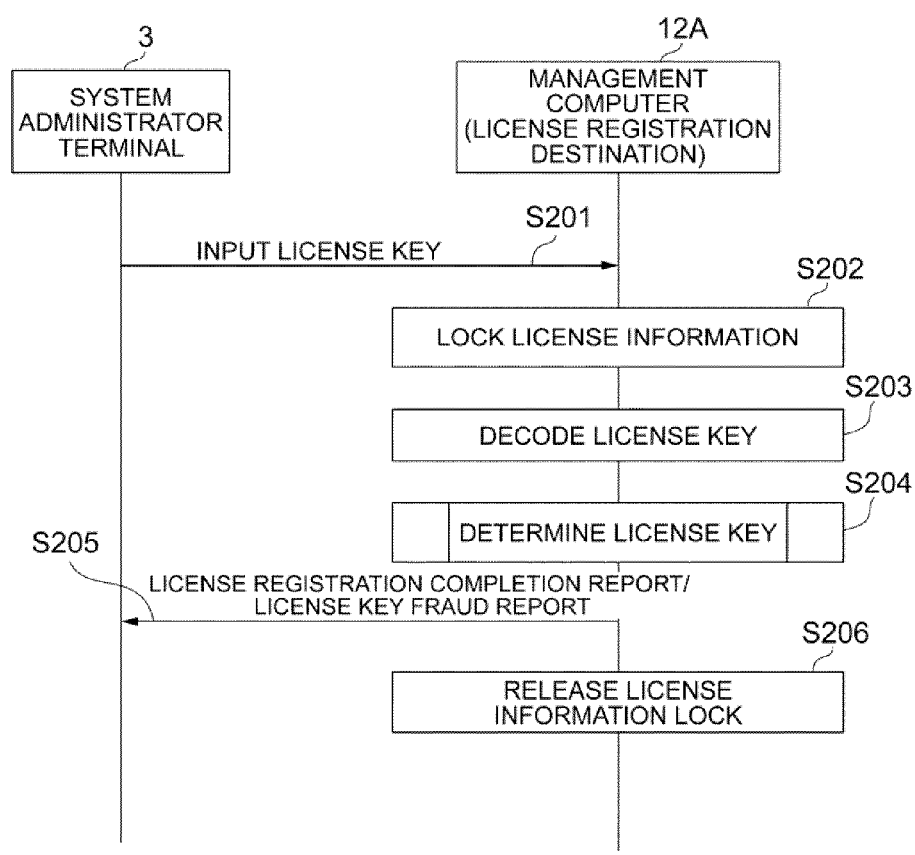
[FIG. 13]

Processing for a case where a license is registered in the physical storage apparatus 2A will be described next. FIG. 13 is a sequence diagram showing an example of a license-registered processing procedure.

In FIG. 13, the physical storage apparatus 2A is first designated as the license registration destination by an input operation by the system administrator of the system administrator terminal 3, and when the license key of the license is input, the license key thus input is transmitted from the system administrator terminal 3 to the management computer 12A of the physical storage apparatus 2A (step S201). The management computer 12A which receives the license key is migrated to a locked state (license information lock) denying access by the other physical storage apparatuses 2B and 2B and by the system administrator terminal 3 to the license information 19A (step S202). Note that the locked state license information 19A permits access by the management computer 12A of its own physical storage apparatus 2A.

The management computer 12A then performs decoding processing to decode the license key received in step S201 on the basis of a predetermined rule (step S203). Further, the management computer 12A performs a license key determination on the basis of the license key decoded in step S203 (step S204).

Figure 14:
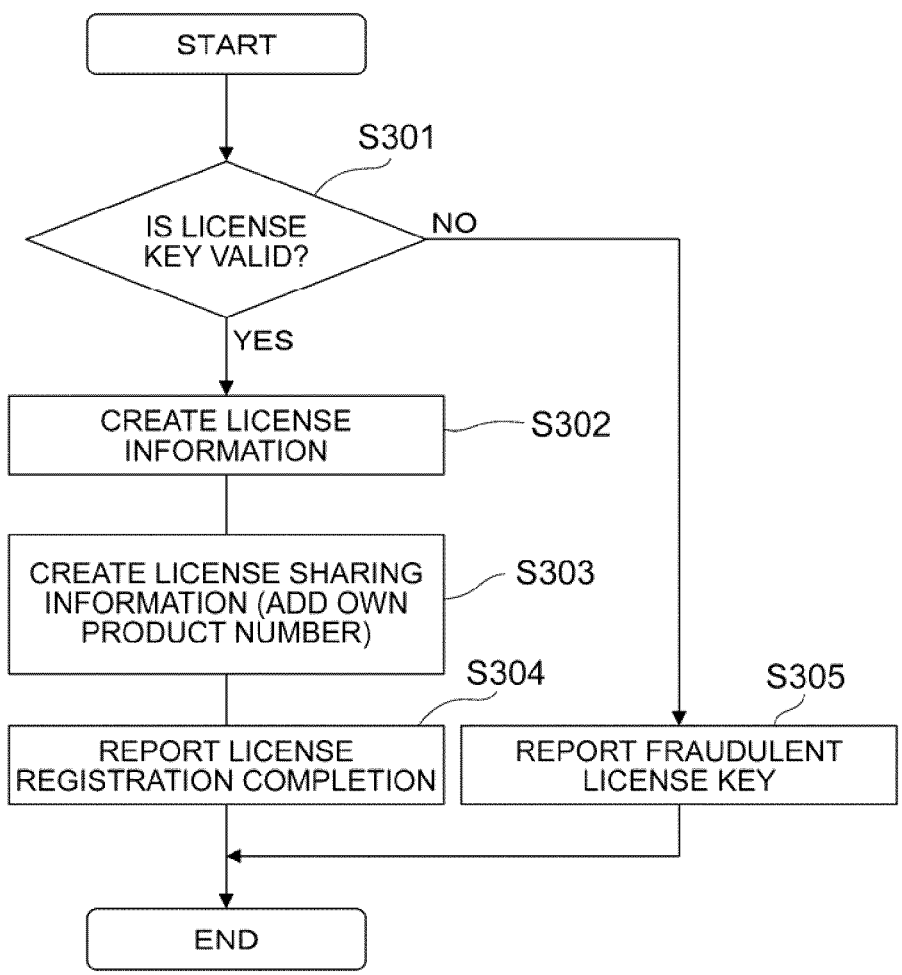
[FIG. 14]

FIG. 14 is a flowchart showing an example of a license key determination processing procedure. As shown in FIG. 14, the management computer 12A first determines whether the target license key (or decoded license key) is a normal license key (step S301). There are no particular restrictions on the method for determining whether the license key is a normal license key, and a method which is typically used to determine whether a license key is normal may be used. If it is determined in step S301 that the license key is an abnormal license key (NO in step S301), the management computer 12A reports the determination result that the license key is abnormal (step S305) and ends the license key determination processing.

If it is determined in step S301 that the license key is a normal license key (YES in step S301), the management computer 12A creates license information 19A on the basis of the license key (step S302), and establishes and holds each of the table items of the license information 19A. Note that if another license has been registered for the physical storage apparatus 2A and the license information 19A already exists, the management computer 12A adds a new row to the existing license information 19A, registers new license information on the basis of the license key in the added row, and updates the license information 19A.

The management computer 12A then creates or updates license sharing information 20A on the basis of the license information 19A created or updated in step S302 and a product number which has been individually assigned to the physical storage apparatus 2A. Thereafter, the management computer 12A reports that the license registration is complete (step S304) and ends the license key determination processing.

When the license key determination processing of step S204 is complete as a result of the series of processes of steps S301 to S305 of FIG. 14 above, the management computer 12A transmits a license registration completion report or a license key fraud report to the system administrator terminal 3 in accordance with the determination result of the license key determination processing (step S205). More specifically, if the processing of step S304 of FIG. 14 is performed, the management computer 12A transmits a license registration completion report to report that the license registration is complete to the system administrator terminal 3, and if the processing of step S305 of FIG. 14 is performed, the management computer 12A transmits a license key fraud report to report that the license key is fraudulent to the system administrator terminal 3. Thereafter, the management computer 12A releases the locked state of the license information 19A locked in step S202 (step S206) and ends the processing.

(1-6-3) License Information Update Processing

Figure 15:
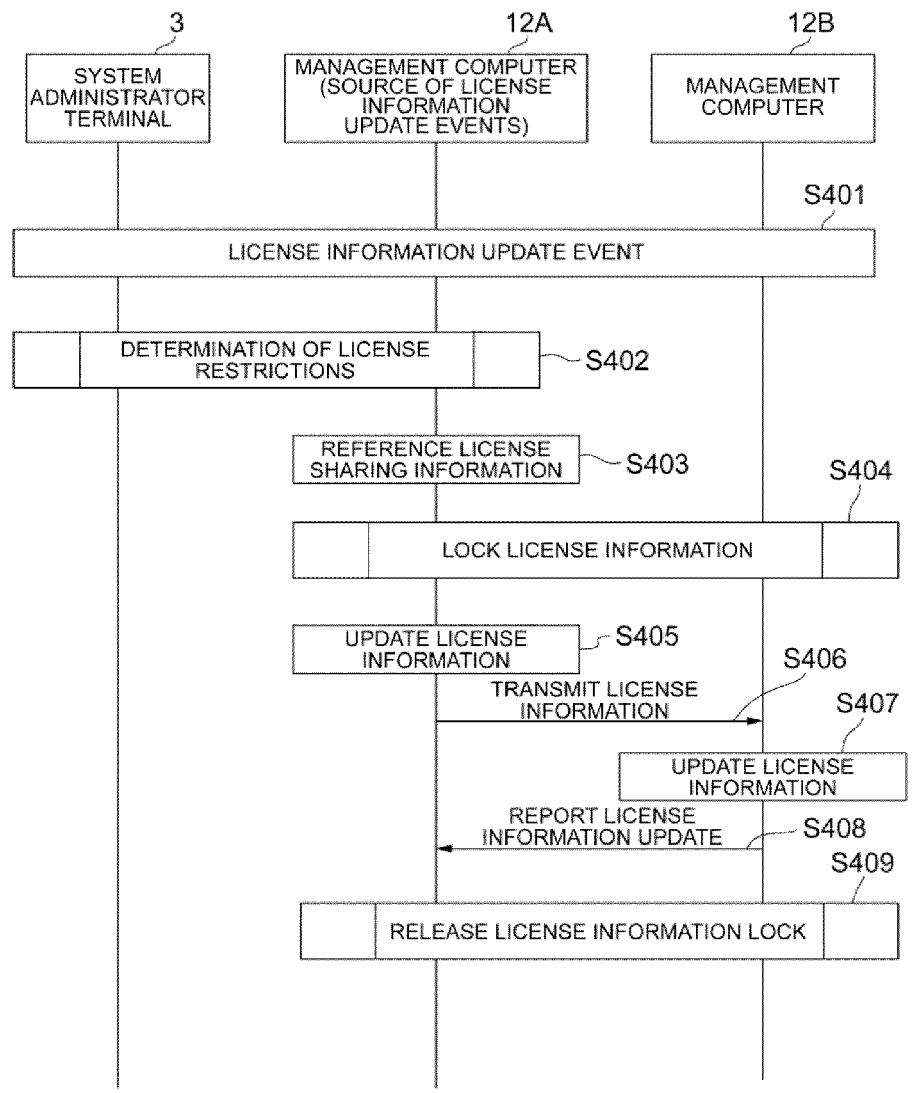
[FIG. 15]

Processing when a license information update event is generated if the physical storage apparatuses 2A and 2B share a license will be described next with reference to FIG. 15. FIG. 15 is a sequence diagram showing an example of processing in a case where a license information update event is generated.

First, suppose that, in step S401, a license information update event such as those shown in entries 190A to 190J of FIG. 11 is generated in the physical storage apparatus 2A.

Here, the management computer 12A of the physical storage apparatus 2A performs a license restriction determination (step S402). The license restriction determination is performed in accordance with the processing shown in FIG. 12. Note that, if the license information update event generated in step S401 is an event in which the defined content of the license is changed by the system administrator terminal 3 as per the entries 190B, 190D, 190F, and 190H, for example, the management computer 12A may take the modified license defined content which is input from the system administrator terminal 3 as a comparison reference (license restriction) in the license restriction determination of step S402.

The management computer 12A subsequently references the license sharing information 20A (step S403) and acquires information of another physical storage apparatus 2 (the physical storage apparatus 2B, for example) which shares the license on the basis of the product number contained in the storage apparatus product number field 122. Further, the management computer 12A places the license information 19A and 19B, which are acquired in step S403 and respectively owned by the management computer 12A and the management computer 12 (the management computer 12B, for example) of another physical storage apparatus 2 which share the license, in a locked state (step S404).

Figure 16:
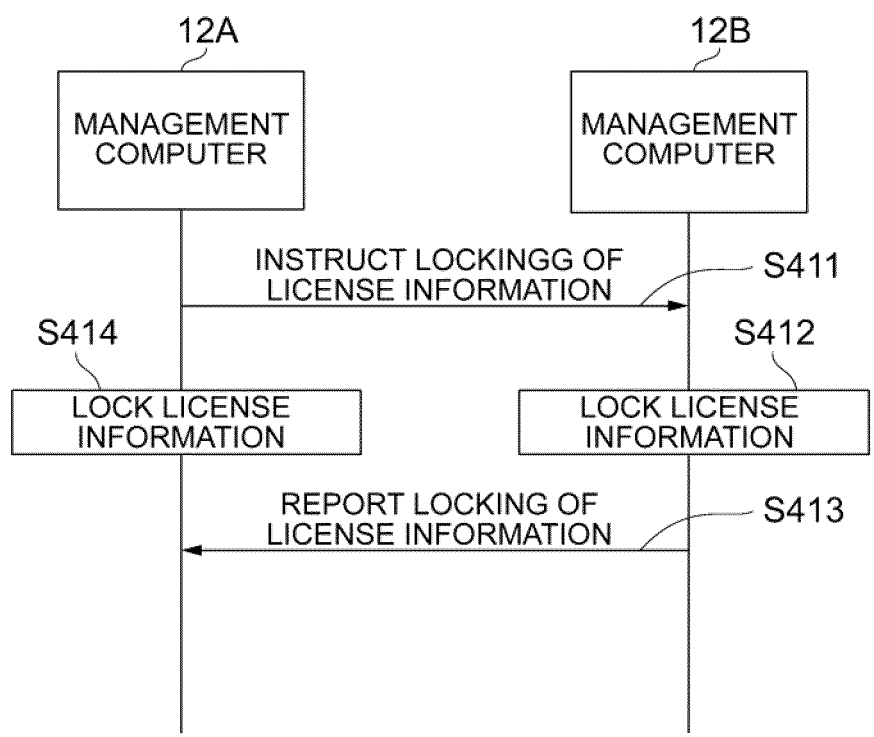
[FIG. 16]

FIG. 16 is a sequence diagram showing an example of a license information lock processing procedure of a plurality of management computers. In FIG. 16, the management computer 12A first transmits a license information lock instruction instructing the management computer 12B to shift the license information 19B to a locked state in which access by other physical storage apparatuses 2 is denied (step S411). The management computer 12B, which receives the license information lock instruction, places the license information 19B in a locked state (step S412) and transmits a license information lock report reporting that the license information 19B has been placed in a locked state to the management computer 12A (step S413).

Further, while issuing an instruction to instruct the management computer 12B to place the license information 19B in a locked state, the management computer 12A also places its own license information 19A in a locked state (step S414). There are no particular limitations on the order of the locking of the license information 19A and the locking of the license information 19B. Note that the locked license information 19A permits access from the management computer 12A of the own physical storage apparatus 2. Further, the locked license information 19B permits access by the management computer 12A which issued the locked state instruction in addition to access by the management computer 19B of the own physical storage apparatus 2B. In step S404, the license information 19A and 19B enter a locked state as a result of the series of processes indicated in steps S411 to S414 of FIG. 16.

Thereafter, the management computer 12A updates the license information 19A with the license information table update item corresponding to the license information update event generated in step S401 (see the license information update item field 192 in FIG. 11) (step S405). The management computer 12A then transmits the license information 19A updated in step S405 to the management computer 12B (step S406) and the management computer 12B updates the license 19B in accordance with the received license information 19A (step S407).

When the update of the license information 19B is complete in step S407, the management computer 12B transmits a license information update report to report that the license information 19B has been updated to the management computer 12A (step S408). Further, when the management computer 12A receives the license information update report, the management computer 12A and the management computer 12B release the lock of the license information 19A and 19B which respectively remain in the locked state established in step S404 (step S409). The specific processing of step S409 will be described with reference to FIG. 17.

Figure 17:
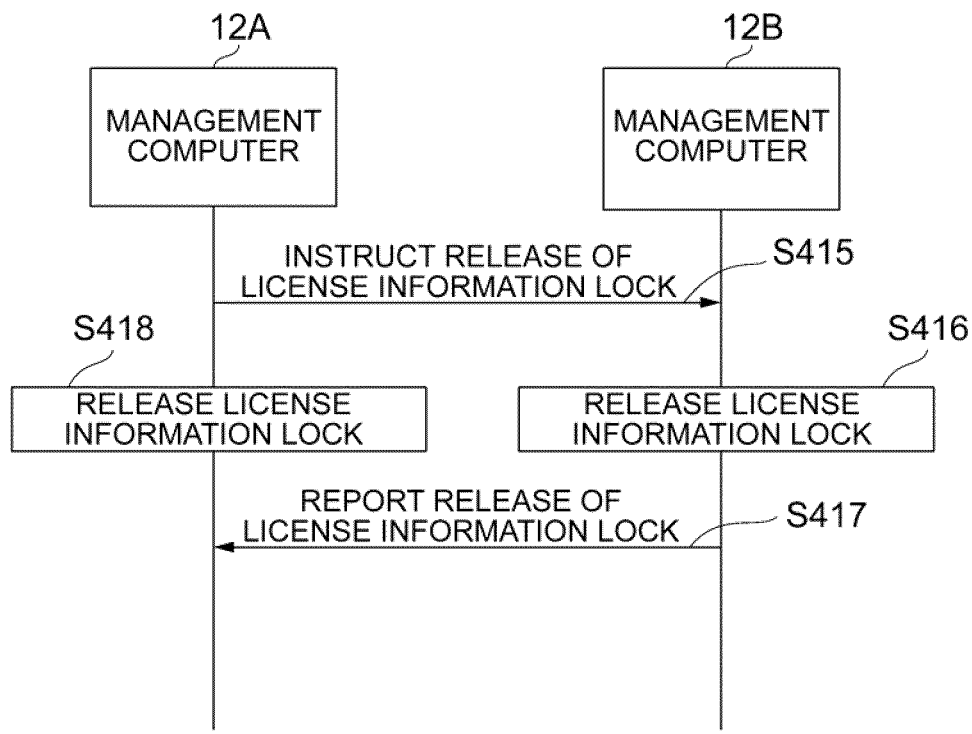
[FIG. 17]

FIG. 17 is a sequence diagram showing an example of a license information lock release processing procedure for a plurality of management computers. In FIG. 17, the management computer 12A first transmits a license information lock release instruction instructing the management computer 12B to release the locked state of the license information (step S415). The management computer 12B, which receives the license information lock release instruction, releases the locked state of the license information 19B (step S416) and transmits a license information lock release report to report that the locked state of the license information 19B has been released to the management computer 12A (step S417).

Further, while instructing the management computer 12B to release the locked state of the license information 19B, the management computer 12A also releases the locked state of its own license information 19A (step S418). There are no particular limitations on the order in which the locked state of the license information 19A is released and the locked state of the license information 19B is released. In step S409, the locked states of the license information 19A and 19B are released as a result of the series of processes indicated in steps S415 to S418 of FIG. 17 above, and the license information update ends.

Note that, although FIGS. 16 and 17 illustrate a case where the management computers 12A and 12B, which are in the two physical storage apparatuses 2A and 2B respectively, lock or release the license information 19A and 19B, if respective management computers 12 in three or more physical storage apparatuses 2 lock or release the license information 19, this arrangement can be effected in the same way as the processing of FIG. 16 or FIG. 17 simply by increasing the targets of the instruction to lock or release the license information 19. Further, the setting of a locked state for the license information 19 as well as a locked state release setting can be formally made even when no target license information 19 exists.

(1-6-4) License Sharing Processing

Processing to newly add and share another physical storage apparatus 2 to a license shared by a plurality of physical storage apparatuses 2 will be described next. More specifically, processing when, for example, a physical storage apparatus 2C is newly connected to the physical storage apparatuses 2A and 2B which are connected so as to share a license and the management computer 12A of the physical storage apparatus 2A is instructed by the system administrator terminal 3 to also share the license with the physical storage apparatus 2C is described with reference to FIG. 18.

Figure 18:
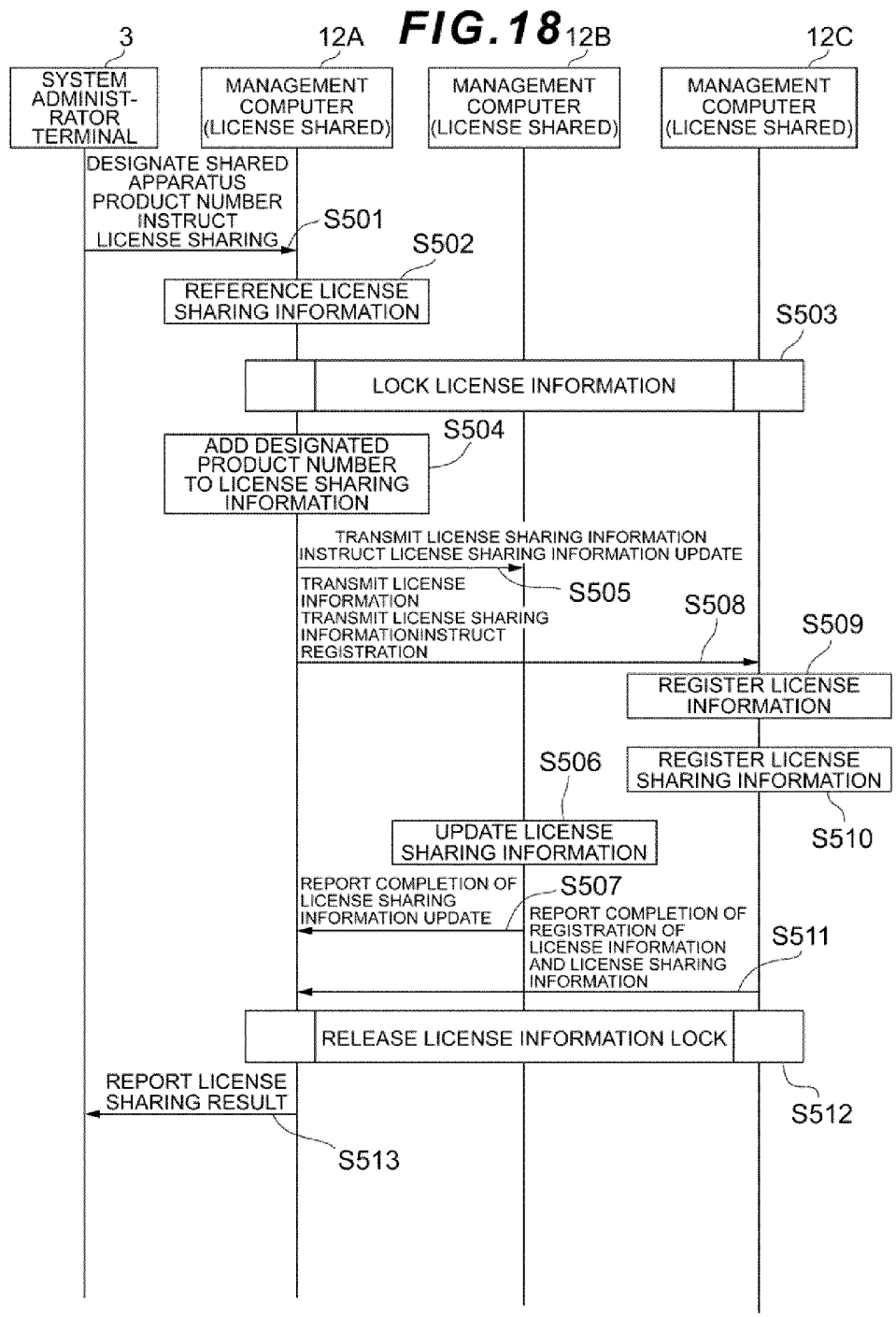
[FIG. 18]

FIG. 18 is a sequence diagram showing an example of a processing procedure to add a license sharing target. In FIG. 18, the system administrator terminal 3 first designates a product number of the physical storage apparatus 2C which newly shares the license and transmits the license sharing instruction to the management computer 12A of the physical storage apparatus 2A (step S501). The management computer 12A, which receives the product number and the license sharing instruction of the physical storage apparatus 2C, references the license sharing information 20A (step S502) and acquires information of another physical storage apparatus 2 (the physical storage apparatus 2B, for example) which shares the license on the basis of the product number contained in the storage apparatus product number field 122.

Further, the management computer 12A places the license information 19A, 19B, and 19C which are respectively owned by the management computer 12A, the management computer 12B of the physical storage apparatus 2B acquired in step S502 and the management computer 12C of the physical storage apparatus 2C which can be specified from the product number acquired in step S501 in a locked state (step S503). The processing of step S503 adds the management computer 12C to the lock instruction destinations and may be performed in the same way as the license information lock processing shown in FIG. 16, and hence a detailed description is omitted.

The management computer 12A subsequently adds the product number of the physical storage apparatus 2C received in step S501 to the storage apparatus product number field of license sharing information 20A (see the storage apparatus product number field 122 in FIG. 7) (step S504). When the license sharing information 20A is updated in step S504, the management computer 12A transmits the updated license sharing information 20A to the management computer 12B and instructs same to update license sharing information 20B (step S505). The management computer 12B then updates the license sharing information 20B in accordance with the instruction from the management computer 12A in step S505 (step S506) and reports that the update to the license sharing information 20B is complete to the management computer 12A (step S507).

Further, the management computer 12A which updates the license sharing information 20A in step S504 transmits the license information 19A and the license sharing information 20A to the management computer 12C of the physical storage apparatus 2C which is the license sharing target, and instructs [the management computer 12C] to register the license information 19A and the license sharing information 20A (step S508). The management computer 12C then registers the license information 19A as the license information 19C in the memory in the management computer 12C in accordance with the instruction from the management computer 12A in step S508 (step S509) and registers the license sharing information 20A as the license sharing information 20C (step S510). Thereafter, the management computer 12C reports that registration of the license information 19C and the license sharing information 20C is complete to the management computer 12A (step S511).

When the processing of steps S505 to S507 which relate to the management computer 12B and the processing of steps S508 to S511 which relate to the management computer 12C are complete, the management computer 12A instructs the management computer 12B and the management computer 12C to release the locking of the license information 19B and 19C, and the management computers 12A, 12B, and 12C release the locked state of the license information 19A, 19B, and 19C (step S512). The processing of step S512 adds the management computer 12C to the destinations of the lock release instruction and may be performed in the same way as the processing to release the locking of the license information shown in FIG. 17, and hence a detailed description is omitted.

When the processing to step S512 is complete, the physical storage apparatus 2C is added to the license shared by the physical storage apparatuses 2A and 2B and the license information 19A to 19C and the license sharing information 20A to 20C are shared as the same data between the physical storage apparatuses 2A to 2C, and therefore the management computer 12A reports that the license sharing processing is complete to the system administrator terminal (step S513).

(1-6-5) License Cancelation Processing (1)

Processing to remove a designated physical storage apparatus 2 from license sharing by the plurality of physical storage apparatuses 2 sharing the license will be described next. More specifically, processing if, for example, mutually connected physical storage apparatuses 2A, 2B, and 2C are sharing a license and an instruction is sent from the system administrator terminal 3 to the management computer 12A of the physical storage apparatus 2A to cancel the license sharing of the physical storage apparatus 2B because a connection has been broken will be described next with reference to FIG. 19.

Figure 19:
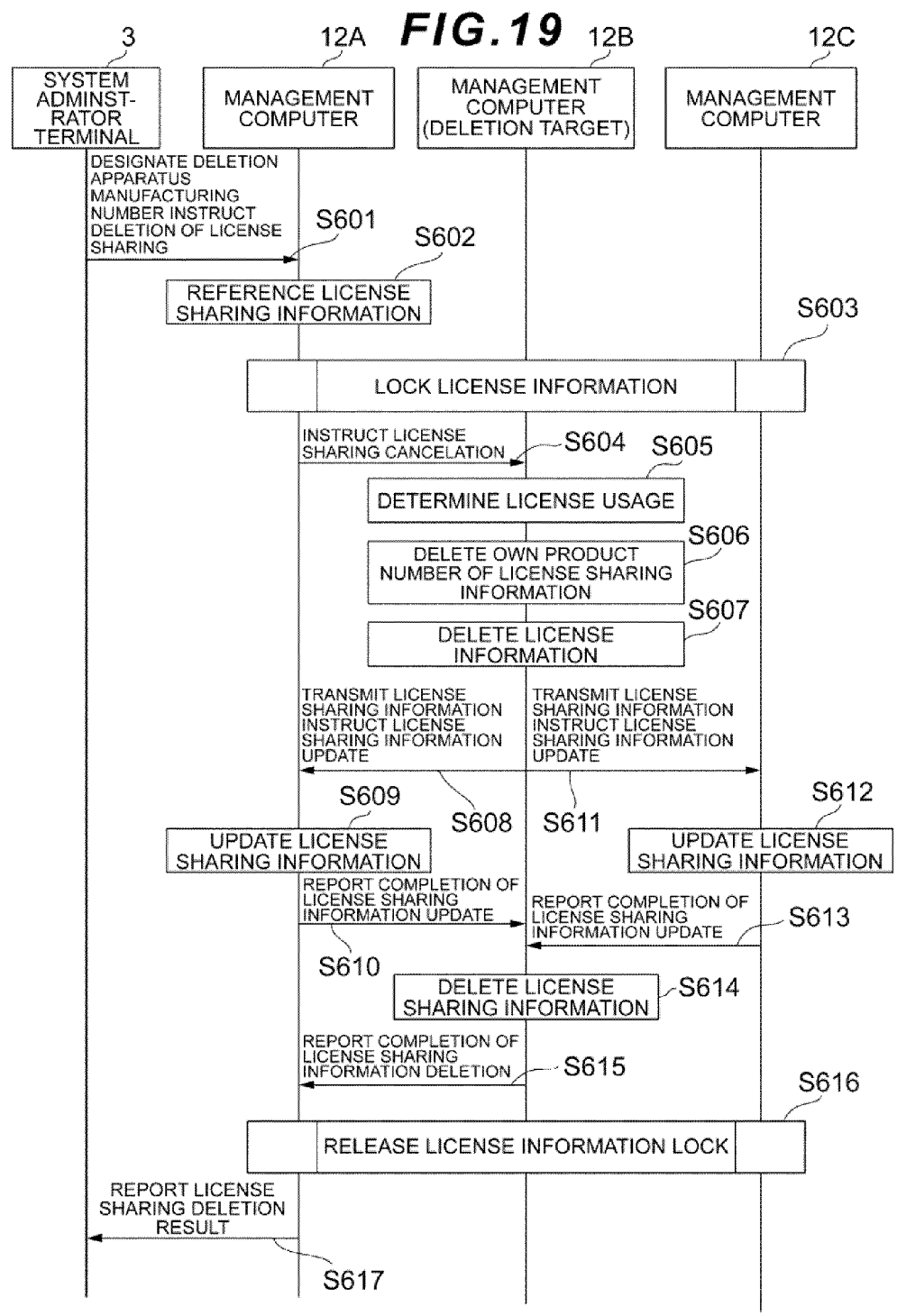
[FIG. 19]

FIG. 19 is a sequence diagram showing an example of a processing procedure to cancel license sharing. In FIG. 19, the system administrator terminal 3 first designates a product number of the physical storage apparatus 2B for which license sharing is to be canceled and transmits a license sharing cancelation instruction to the management computer 12A (step S601). The management computer 12A, which receives the product number of the physical storage apparatus 2B and the license sharing cancelation instruction, references the license sharing information 20A (step S602) and acquires information of the other physical storage apparatuses 2 (the physical storage apparatuses 2B and 2C, for example) which share the license on the basis of the product number contained in the storage apparatus product number field 122.

The management computer 12A then places the license information 19A, 19B, and 19C which are respectively owned by the management computer 12A, the management computer 12B, and the management computer 12C in a locked state from the management computers 12B and 12C of the physical storage apparatuses 2B and 2C acquired in step S602 (step S603). The processing of step S603 adds the management computer 12C to the lock instruction destinations and may be performed in the same way as the license information locking processing shown in FIG. 16, and hence a detailed description is omitted.

The management computer 12A then transfers the license sharing cancelation instruction received in step S601 to the management computer 12B of the physical storage apparatus 2B on the basis of the product number designated in step S601 (step S604). Further, the management computer 12B, which receives the license sharing cancelation instruction, references the resource management information 22B and determines the usage status of whether its own physical storage apparatus 2B is using the license (step S605). More specifically, if the logical volume 24 of the physical storage apparatus 2B is being used for the already removed pool of the integrated pool volume 26, for example, it is determined that its own storage is using the license, and if the virtual DKC running on the virtual storage apparatus 8 is using the resources (the processor, for example) of the physical storage apparatus 2B, it is determined that its own storage is using the license. In a case where it is determined in step S605 that its own storage is using the license, removal of its own storage in the current state from license sharing is not desirable, and hence the management computer 12B notifies the management computer 12A or the system administrator terminal of an error.

Processing for a case where it is determined that its own storage is not using the license in step S605 will be described hereinbelow. Here, the management computer 12B removes the product number of its own physical storage apparatus 2B from the license sharing information 20B (step S606) and deletes all the license information 19B (step S607).

The management computer 12B then transmits the license sharing information 20B which was updated in step S606 to the other management computers 12A and 12C and instructs that the respective own license sharing information 20A and 20C be updated by means of the license sharing information 20B (steps S608, S611). The management computers 12A and 12C, which receive this instruction, update the respective license sharing information 20A and 20C with the license sharing information 20B for which the product number of the physical storage apparatus 2B has been removed (steps S609, S612) and reports completion of the update to the management computer 12B (steps S610, S613).

When the processing of steps S608 to S610 for the management computer 12A and the processing of steps S611 to S613 are complete for the management computer 12C, the management computer 12B deletes the license sharing information 20B (step S614) and notifies the management computer 12A that deletion of the license sharing information 20B is complete (step S615). Further, when the license sharing information deletion completion report is received in step S615, the management computer 12A instructs the management computer 12B and management computer 12C to release the locking of the license information 19B and 19C, and the management computers 12A, 12B, and 12C release the locking of the respective license information 19A to 19C (step S616). In reality, although the license information 19B is deleted in step S607, as will be described subsequently, even in a case where the target license information 19B does not exist, the management computer 12B formally makes settings so that the locked state of the license information 19B is released. The processing of step S616 adds the management computer 12C to the lock release instruction destinations and may be performed in the same way as the license information lock release processing shown in FIG. 17, and therefore a detailed description is omitted.

When the processing as far as step S616 ends, neither the license information 19B nor the license sharing information 20B exists in the physical storage apparatus 2B and the physical storage apparatuses 2A and 2C which share the license comprise data of the same content in the respective license information 19 and license sharing information 20, and therefore the physical storage apparatus 2B may be said to have been completely removed from the license sharing target. Finally, the management computer 12A transmits a completion report regarding the cancelation of license sharing indicated in step S601 to the system administrator terminal 3 (step S617).

(1-6-6) License Cancelation Processing (2)

Other processing to remove a designated physical storage apparatus 2, from the plurality of physical storage apparatuses 2 sharing a license, from license sharing will be described next. FIG. 19 illustrates processing for when, if the mutually connected physical storage apparatuses 2A, 2B, and 2C share a license, a cancelation instruction is sent from the system administrator terminal 3 to the physical storage apparatus 2A which is different from the physical storage apparatus 2B targeted for license sharing cancelation, but hereinbelow processing for when a cancelation instruction is sent from the system administrator terminal 3 to the physical storage apparatus 2B targeted for license sharing cancelation will be described with reference to FIG. 20.

Figure 20:
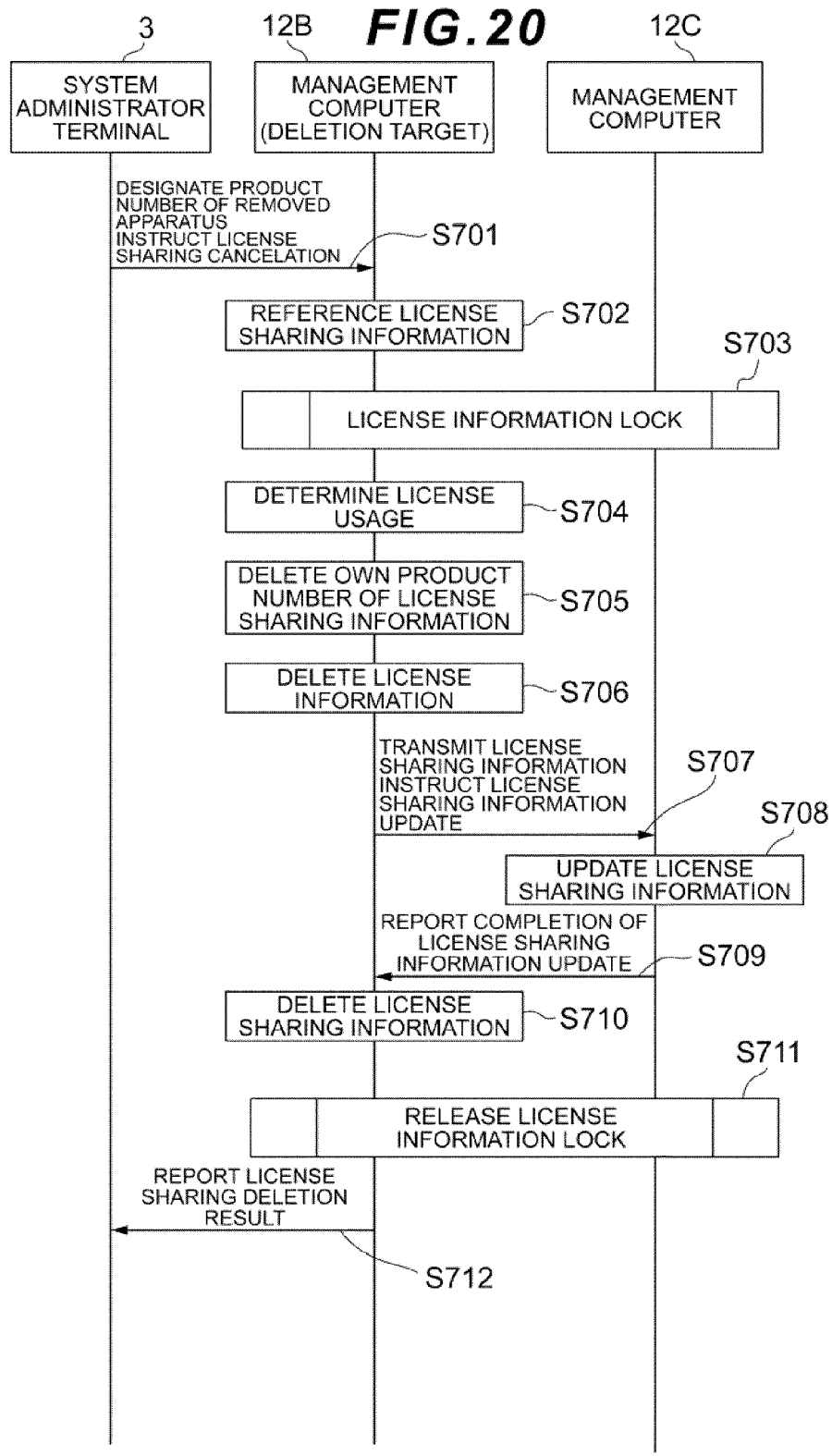
[FIG. 20]

FIG. 20 is a sequence diagram showing another example of a processing procedure for canceling license sharing. In FIG. 20, a description of the management computer 12A of the physical storage apparatus 2A is omitted. In FIG. 20, the system administrator terminal 3 first designates a product number of a physical storage apparatus 2B targeted for license sharing cancelation and transmits a license sharing cancelation instruction to the management computer 12B (step S701).

The processing in which management computer 12B, which receives the product number of the physical storage apparatus 2B and the license sharing cancelation instruction transmitted in step S701, references the license sharing information 20B (step S702), and acquires information of the other physical storage apparatuses 2 sharing the license (the physical storage apparatuses 2A and 2C, for example) and places the license information 19A to 19C respectively owned by the management computer 12A to 12C in a locked state between the management computers 12A to 12C (step S703) is the same as the processing of steps S602 to S603 of FIG. 19, and therefore a description thereof is omitted.

Furthermore, the processing in which, after placing the license information 19A to 19C in a locked state in step S703, the management computer 12B determines the license usage status (step S704), deletes the product number of the own physical storage apparatus 2B from the license sharing information 20B (step S705), and deletes all the license information 19B (step S706) is the same as the processing of steps S605 to S607 of FIG. 19.

Further, the processing in which the management computer 12B transmits the license sharing information 20B updated in step S705 and instructs the other management computer 12C to update the license sharing information 20C by means of the license sharing information 20B (step S707), and in which the management computer 12C which receives the instruction updates the license sharing information 20C by means of the license sharing information 20B (step S708), and reports update completion to the management computer 12B (step S709) is the same as the processing of steps S611 to S613 of FIG. 19. Although the management computer 12A of the physical storage apparatus 2A does not appear in FIG. 20, the management computer 12A also performs the same processing as that of steps S707 to S709 by the management computer 12C.

When the processing as far as step S709 is complete and the license sharing information 20A and 20C in the physical storage apparatuses 2A and 2C other than the physical storage apparatus 2B targeted for license sharing cancelation is updated by means of the license sharing information 20B, the management computer 12B deletes the license sharing information 20B (step S710) and, similarly to the processing of step S616 of FIG. 19, instructs the management computer 12A and management computer 12C to cancel the lock of the license information 19A and 19C, and the management computers 12A, 12B, and 12C cancels the locking of the respective license information 19A to 19C (step S711). Finally, the management computer 12B transmits a report regarding the completion of the license sharing cancelation instructed in step S701 to the system administrator terminal 3 (step S712).

(1-7) Advantageous Effects of Embodiment

According to this storage system 1, if, with regard to a license which is assigned to virtual storage spanning a plurality of physical storage apparatuses 2, a license is assigned to the virtual storage apparatus 8, for example, because the respective management computers 12A to 12C of the plurality of physical storage apparatuses 2A to 2C constituting the virtual storage apparatus 8 hold the same license information 19A to 19C, the same license can be shared by the plurality of physical storage apparatuses 2A to 2C. Note that, because the license information 19 of the management computer 12 and the license information 14 of the controller portion 11 are synchronized with the same content, the management computers 12A to 12C hold the same license information 19A to 19C, and hence it may also be said that the controller portions 11A to 11C which are physical controllers hold the same license information 14A to 14C. Further, the storage system 1 does not need to issue a different license for each physical controller (controller portion 11), and there is no need to perform different license management for each physical storage apparatus 2, and hence license management becomes straightforward.

Moreover, in the storage system 1, because the same license information is shared between a plurality of physical controllers, licenses which are assigned spanning a plurality of physical storage apparatuses 2A to 2C can be managed using a single license key, and hence license key management is straightforward.

Further, conventionally, if a license targeting virtual storage is assigned, in a case where a license is assigned to a virtual storage environment and a license is not assigned to each physical controller, because licenses cannot be restricted using a physical configuration, the possibility of permanent license usage has been considered; however, with the storage system 1, because the controller portion 11, which is a physical controller, holds license information for each of the physical storage apparatuses 2 sharing a license, the license usage term can be suitably managed.

Furthermore, with the storage system 1, as shown in FIG. 15, if a license information update event is generated, the license information is updated according to the event content generated in all the management computers sharing the license. Accordingly, if an event relating to a change to the configuration of the virtual storage is configured, such as the creation of a virtual pool or a change in the processor usage count by the virtual DKC on the occasion of a license information update, for example, even if a change to the virtual storage configuration is generated, the storage system 1 is able to hold the same license information between a plurality of controllers and easily maintain license sharing management after performing a license information update in accordance with the change in configuration. Further, if an event relating to a change in the license restrictions, where, for example, the upper limit of the pool capacity which can be used by the virtual DKC is changed in response to the license information update, the storage system 1 is also able to change the license limit value while maintaining the license sharing management and is able to flexibly deal with changes in the license settings.

Moreover, with the storage system 1, as shown in FIGS. 18 to 20, because processing to add or cancel license sharing for the physical storage apparatuses 2 can be executed while still maintaining a continued state of license sharing by the physical storage apparatuses 2, in cases where a physical storage apparatus 2 is exchanged, or similar, the user is able to flexibly allocate and use licenses without purchasing a new license. Therefore, an effect whereby costs are reduced without forcing the user to make excessive license purchases can be expected.

Further, with the storage system 1, a determination of license usage feasibility can be made by any of the physical storage apparatuses 2 which share the license by means of a license restriction determination, shown in FIG. 12, of the upper limit imposed by the license and the current total usage amount because the license information 19 is shared between the apparatuses.

(2) Second Embodiment

In addition to the configuration of the storage system according to the first embodiment, the storage system according to the second embodiment of the present invention further comprises an integrated management computer which performs collective storage management and license sharing.

(2-1) Configuration of Storage System According to the Second Embodiment

Figure 21:
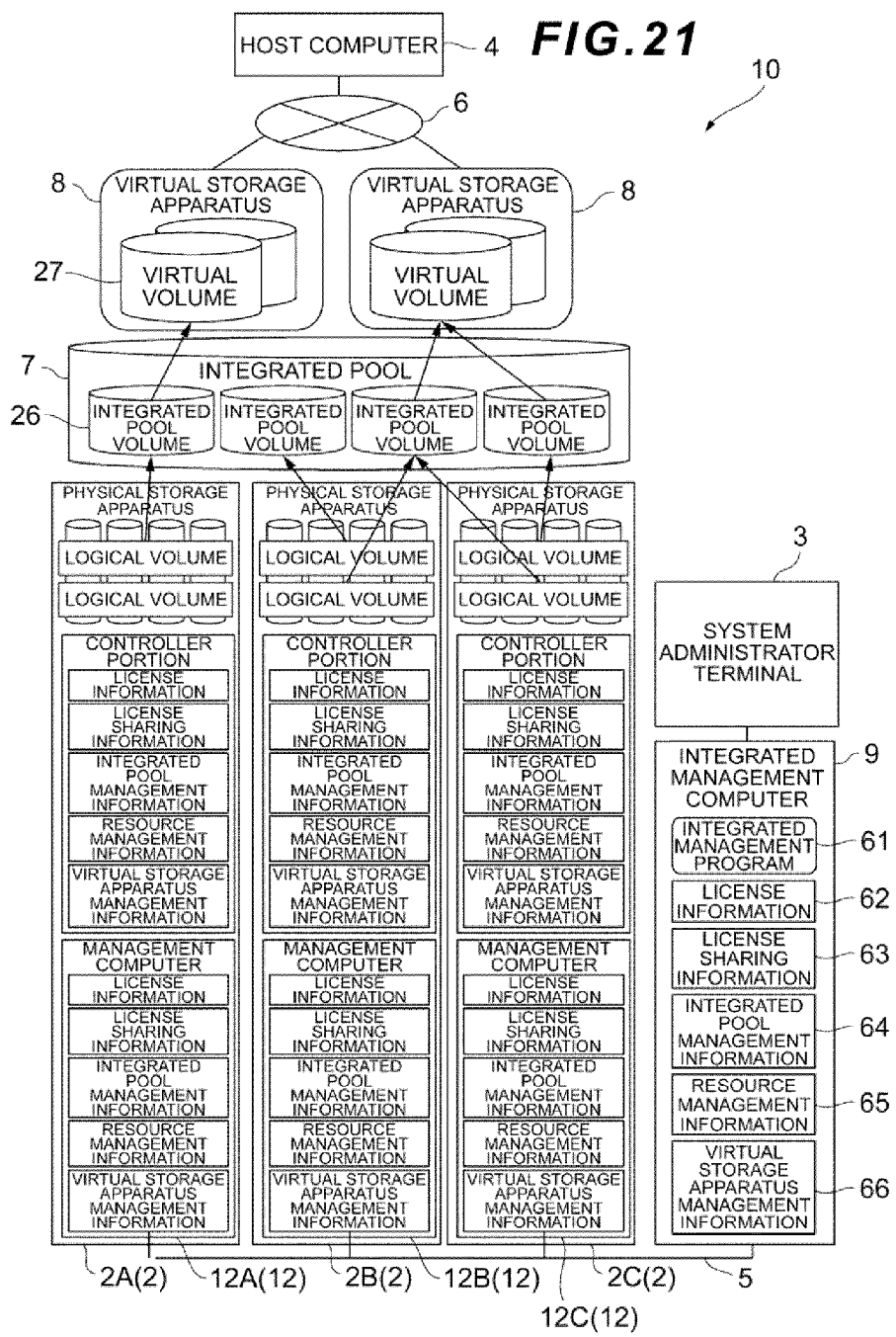
[FIG. 21]
Figure 23:
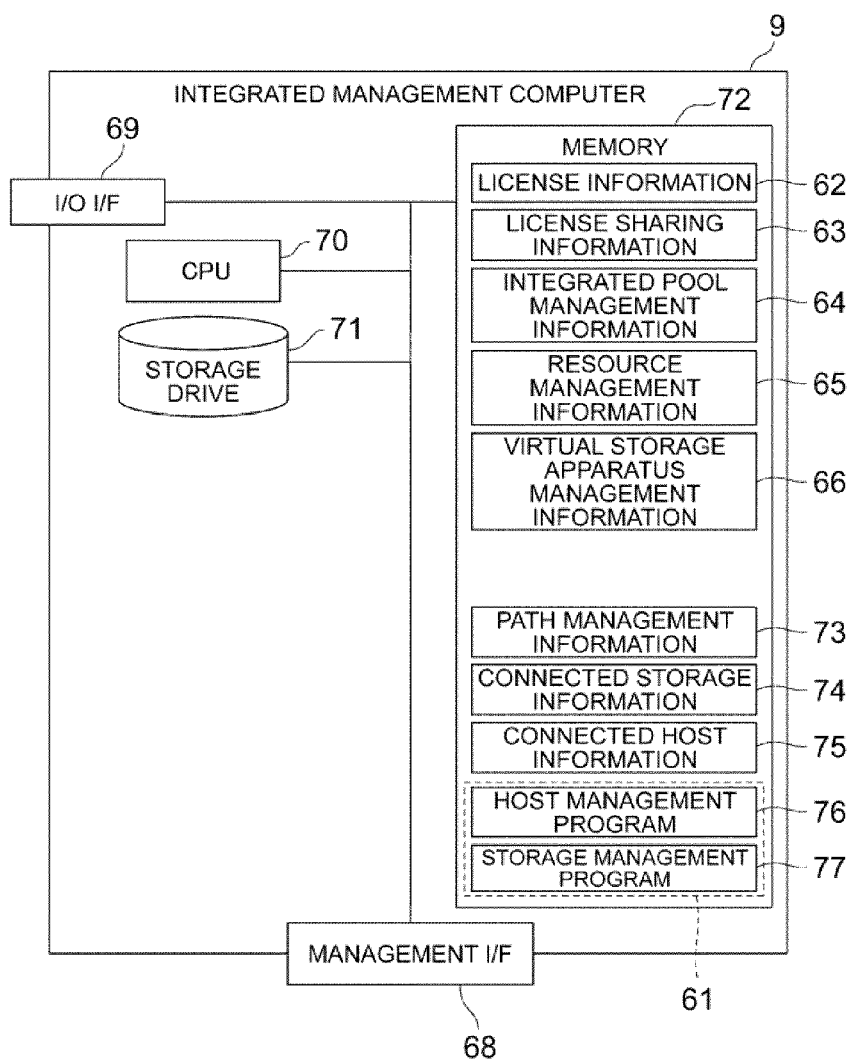
[FIG. 23]

FIG. 21 is a block diagram showing the configuration of the storage system according to the second embodiment. The configuration of the storage system 2 shown in FIG. 21 is the same as the configuration of the storage system 1 shown in FIG. 1 except for further comprising an integrated management computer 9 between the plurality of physical storage apparatuses 2 and the system administrator terminal 3 and a description of common configurations will be omitted. In FIG. 23, the integrated management computer 9 comprises an integrated management program 61 capable of integrated management of storage and does not include a storage management program in the system administrator terminal 3. The integrated management computer 9 is a computer for collectively holding information relating to license sharing and storage management of the plurality of physical storage apparatuses 2 and the internal configuration of the integrated management computer 9 will be described subsequently with reference to FIG. 23.

FIG. 22 is a block diagram showing the overall configuration of the storage system shown in FIG. 21. The overall configuration of the storage system 2 shown in FIG. 22 is the same as the overall configuration of the storage system 1 shown in FIG. 2 except for the fact that a management I/F 68 of the integrated management computer 9 connected to the system administrator terminal 3 is connected not only to the management I/F 29 of the physical storage apparatuses 2 but also to the management I/F 31 of the host computer 4 via the management network 5. Because the management I/F 68 of the integrated management computer 9 is connected to the management I/F 31 of the host computer 4, the integrated management computer 9 is able to manage the host computer 4.

FIG. 23 is a block diagram showing the internal configuration of the integrated management computer. As shown in FIG. 23, the integrated management computer 9 is configured as a result of the management I/F 68, an I/O I/F 69, a CPU 70, a storage drive 71, and a memory 72 being connected via an internal bus.

The CPU 70 is a processor which performs operational control of the whole integrated management computer 9 and which reads programs stored in the storage drive 71 to the memory 72 and, where necessary, executes the read programs. The storage drive 72 is configured from a high-cost disk device such as a SCSI disk or a low-cost disk device such as a SATA disk or an optical disk, for example.

In addition to being used to store various programs which are read from the storage drive 71, the memory 72 is also used as a working memory of the CPU 70. The memory 72 stores license information 62, license sharing information 63, integrated pool management information 64, resource management information 65, virtual storage apparatus management information 66, path management information 73, connected storage information 74, and connected host information 75. Further, the integrated management program 61 read from the storage drive 71 is also stored in the memory 72. FIG. 23 shows that the integrated management program 61 comprises a host management program 76 for managing the host computer 4 and a storage management program 77 for managing the plurality of physical storage apparatuses 2.

The license information 62, the license sharing information 63, the integrated pool management information 64, the resource management information 65, and the virtual storage apparatus information 66 are information for collecting name information stored in each controller portion 11 and management computer 12 of the plurality of physical storage apparatuses 2 to which the integrated management computer 9 is connected. Further, the path management information 73, the connected storage information 74, and the connected host information 75 are data which respectively correspond to the path management information 47, the connected storage information 48, and the connected host information 49 shown in FIG. 5 in the first embodiment and various information of the plurality of physical storage apparatuses 2 are collected.

Furthermore, as shown in FIG. 5 according to the first embodiment, the host management program 76 and the storage management program 77 are programs which correspond to the host management program 50 and the storage management program 51 which are held in the management computers 12 of the physical storage apparatuses 2, and which realize a function for pooling the host management program 50 and storage management program 51 in the plurality of management computers 12 by being held in the integrated management computer 9 which collectively manages the plurality of physical storage apparatuses 2.

In this integrated management computer 9, the memory 72 stores the various foregoing information and, as a result of the CPU 70 executing the storage management program 77 of the integrated management program 61, the integrated management computer 9 collectively manages the storage provided by the plurality of physical storage apparatuses 2 in place of the controller portion 11 in each physical storage apparatus 2 of the storage system 1. In addition, as a result of the storage management program 77 being executed by the CPU 70, the integrated management computer 9 manages license sharing of the plurality of physical storage apparatuses 2 in place of the management computer 12 in each physical storage apparatus 2 of the storage system 1.

Note that the specific processing of the license sharing management of the plurality of physical storage apparatuses 2 realized by the integrated management computer 9 can likewise be realized as a result of the integrated management computer 9 receiving an instruction which is transmitted from the system administrator terminal 3 to any of the management computers 12 in each of the processes shown in FIGS. 13 and 15 to 20 and as a result of the integrated management computer 9 issuing an instruction for each process to each of the physical storage apparatuses 2, and hence individual descriptions thereof are omitted.

(2-2) Advantageous Effects of Embodiment

With this storage system 10, as a result of the integrated management computer 9 being able to collectively perform management of licenses which are assigned across the plurality of physical storage apparatuses 2 and perform storage management, if processing to add or cancel licenses of the physical storage apparatuses 2 is performed, an instruction can be transmitted directly to the targeted physical storage apparatuses 2. More specifically, for example, in the first embodiment, as shown in FIG. 19, a cancelation instruction of the management computer 12B is sometimes transmitted from the system administrator terminal 3 to the management computer 12A which is not a cancelation target, but, in the second embodiment, a cancelation instruction can always be transmitted to the cancelation target management computer 12B as shown in FIG. 20 in the first embodiment. As a result, because transferring a cancelation instruction or the like is unnecessary, in addition to the effects of the first embodiment, the processing speed of the whole storage system 10 can be improved. Further, efficiently performing control of the host computer 4 can also be expected.

Note that the present invention is not limited to the foregoing embodiments, rather, encompasses a variety of modifications. For example, the foregoing embodiments were described in detail in order to facilitate an understanding of the present invention but are not necessarily limited to comprising all the configurations described. In addition, part of the configuration of a certain embodiment can be replaced for the configuration of another embodiment, and another embodiment can also be added to the configuration of a certain embodiment. Further, another configuration can be added to, removed from, or substituted for part of the configuration of each embodiment.

In addition, information such as programs, tables, and files and the like which realize each of the foregoing functions can be placed on a recording device such as a memory, a hard disk, or an SSD (Solid State Drive), or on a recording medium such as an IC card, an SD card or a DVD.

Furthermore, control and information lines are shown because they have been deemed necessary for illustration purposes and all the control and information lines need not be shown for manufacturing purposes. In reality, almost all the configurations may be considered to be mutually connected.

REFERENCE SIGNS LIST 1, 10 Storage system
2 (2A to 2C) Physical storage apparatus
3 System administrator terminal
4 Host computer
5 Management network
6 Host communication network
7 Integrated pool
8 Virtual storage apparatus
9 Integrated management computer
11 Controller portion
12 Management computer
13 Storage drive
14, 19, 62, 110 License information
15, 20, 63, 120 License sharing information
25, 51, 77 Storage management program
26 Integrated pool volume
27 Virtual volume
61 Integrated management program

The invention claimed is:

1. A storage system which manages storage areas respectively provided by a plurality of mutually connected physical storage apparatuses as a logical pool which spans the plurality of physical storage apparatuses, and which provides, to a host computer, virtual storage which is configured from virtual volumes to which the storage areas of the logical pool have been assigned, wherein the physical storage apparatuses comprise:

a plurality of storage drives comprising physical storage areas;

a controller portion which manages storage provided by the physical storage apparatuses; and a license management portion which manages licenses which are assigned to the virtual storage by sharing the licenses between a plurality of the physical storage apparatuses which comprise the virtual storage, wherein the controller portion and the license management portion in the same physical storage apparatus synchronize and retain first information enabling the controller portion to manage the storage and second information enabling the license management portion to manage the license, wherein, in the plurality of physical storage apparatuses sharing the license, the respective license management portions maintain the second information relating to the license using the same content, wherein, if at least either of the first information and the second information is modified in the physical storage apparatus, the controller portion and the license management portion in the physical storage apparatus updates the first or second information to achieve mutual synchronization by means of the modified information, and wherein the license management portion in the physical storage apparatus references the second information and reports the updated first or second information to the license management portion of the other physical storage apparatuses sharing the license, and instructs the license management portions to perform an update by means of the transmitted information.

2. The storage system according to claim 1,
wherein the second information comprises:
license information indicating content restricted by the license as well as the current usage status; and
license sharing information indicating all the physical storage apparatuses sharing the license.

3. The storage system according to claim 2,
wherein, if a license key of the license is input,
the license management portion determines whether the input license key is a normal license key, and
wherein, if the license key is normal in this determination, the license management portion creates the license information for the license corresponding to the license key, and
creates license sharing information including a product number of an own physical storage apparatus.

4. The storage system according to claim 2,
wherein the license management portion determines, with predetermined timing, whether the current usage status of the license information does not exceed the content restricted by the license,
wherein, if the affirmative result is obtained in the determination, the license management portion permits usage of the virtual storage corresponding to the license, and
wherein, if a negative result is obtained in this determination, the license management portion does not permit usage of the virtual storage corresponding to the license.

5. The storage system according to claim 2,
wherein, if the license assigned to a first of the physical storage apparatuses is newly added and assigned to a second of the physical storage apparatuses, a first of the license management portions of the first physical storage apparatus performs an update by adding a product number of the second physical storage apparatus to the license sharing information which the first license management portion retains,
the first license management portion reports the license information and the updated license sharing information which the first license management portion retains to the second license management portion of the second physical storage apparatus, and
the second license management portion registers the license information and the license sharing information reported by the first license management portion as license information and license sharing information which the second license management portion retains.

6. The storage system according to claim 2,
wherein, if the license is deleted from a third of the physical storage apparatuses which shares the same license as the first physical storage apparatus,
a third of the license management portions of the third physical storage apparatus deletes the product number of the third physical storage apparatus from the license sharing information which the third license management portion retains, reports this deletion to the first license management portion of the first physical storage apparatus, and deletes the license information which the third license management portion retains, the first license management portion updates its own license sharing information by means of the license sharing information reported by the third license management portion, and, after the first license management portion has updated the license sharing information, the third license management portion deletes the license sharing information which the third license management portion retains.

7. The storage system according to claim 1, further comprising:
an integrated management computer which is connected to the host computer and the plurality of physical storage apparatuses, and collects and retains the first information and the second information of the plurality of physical storage apparatuses.

8. A license management method for managing licenses assigned to virtual storage in a storage system which manages storage areas respectively provided by a plurality of mutually connected physical storage apparatuses as a logical pool which spans the plurality of physical storage apparatuses, and which provides, to a host computer, virtual storage which is configured from virtual volumes to which the storage areas of the logical pool have been assigned, wherein the physical storage apparatuses comprise:
a plurality of storage drives comprising physical storage areas;
a controller portion which manages storage provided by the physical storage apparatuses; and
a license management portion which manages licenses which are assigned to the virtual storage by sharing the licenses between a plurality of the physical storage apparatuses which comprise the virtual storage,
the license management method comprising:
a step in which the controller portion and the license management portion in the same physical storage apparatus synchronize and retain first information enabling the controller portion to manage the storage and second information enabling the license management portion to manage the license; and a step in which, in the plurality of physical storage apparatuses sharing the license, the respective license management portions maintain the second information relating to the license using the same content,
wherein, if at least either of the first information and the second information is modified in the physical storage apparatus, the controller portion and the license management portion in the physical storage apparatus updates the first or second information to achieve mutual synchronization by means of the modified information, and wherein, after updating the first or the second information, the license management portion in the physical storage apparatus references the second information and reports the updated first or second information to the license management portion of the other physical storage apparatuses sharing the license, and instructs the license management portions to perform an update by means of the transmitted information.

9. The license management method according to claim 8,
wherein the second information comprises:
license information indicating content restricted by the license as well as the current usage status; and license sharing information indicating all the physical storage apparatuses sharing the license.

10. The license management method according to claim 9,
wherein, if a license key of the license is input to the license management portion,
the license management portion determines whether the input license key is a normal license key, and
wherein, if the license key is normal in this determination, the license management portion creates the license information for the license corresponding to the license key, and
the license management portion creates license sharing information including a product number of an own physical storage apparatus.

11. The license management method according to claim 9, further comprising:
a step in which the license management portion determines, with predetermined timing, whether the current usage status of the license information does not exceed the content restricted by the license;
a step in which, if the affirmative result is obtained in the determination, the license management portion permits usage of the virtual storage corresponding to the license, and
a step in which, if a negative result is obtained in this determination, the license management portion does not permit usage of the virtual storage corresponding to the license.

12. The license management method according to claim 9,
wherein, if the license assigned to a first of the physical storage apparatuses is newly added and assigned to a second of the physical storage apparatuses,
a first of the license management portions of the first physical storage apparatus performs an update by adding a product number of the second physical storage apparatus to the license sharing information which the first license management portion retains,
the first license management portion reports the license information and the updated license sharing information which the first license management portion retains to the second license management portion of the second physical storage apparatus, and
the second license management portion registers the license information and the license sharing information reported by the first license management portion as license information and license sharing information which the second license management portion retains.

13. The license management method according to claim 9,
wherein, if the license is deleted from a third of the physical storage apparatuses which shares the same license as the first physical storage apparatus,
a third of the license management portions of the third physical storage apparatus deletes the product number of the third physical storage apparatus from the license sharing information which the third license management portion retains, reports this deletion to the first license management portion of the first physical storage apparatus, and deletes the license information which the third license management portion retains,
the first license management portion updates its own license sharing information by means of the license sharing information reported by the third license management portion, and,
after the first license management portion has updated the license sharing information, the third license management portion deletes the license sharing information which the third license management portion retains.

* * * * *